US011467656B2

(12) United States Patent
Spivack

(10) Patent No.: US 11,467,656 B2
(45) Date of Patent: Oct. 11, 2022

(54) VIRTUAL OBJECT CONTROL OF A PHYSICAL DEVICE AND/OR PHYSICAL DEVICE CONTROL OF A VIRTUAL OBJECT

(71) Applicant: Magical Technologies, LLC, Redmond, WA (US)

(72) Inventor: Nova Spivack, Redmond, WA (US)

(73) Assignee: Magical Technologies, LLC, Wilmington, DE (US)

( * ) Notice: Subject to any disclaimer, the term of this patent is extended or adjusted under 35 U.S.C. 154(b) by 0 days.

(21) Appl. No.: 16/806,162

(22) Filed: Mar. 2, 2020

(65) Prior Publication Data

US 2021/0026441 A1    Jan. 28, 2021

Related U.S. Application Data

(60) Provisional application No. 62/813,216, filed on Mar. 4, 2019.

(51) Int. Cl.
| | |
|---|---|
| *G06F 3/00* | (2006.01) |
| *G06F 3/01* | (2006.01) |
| *G06F 21/32* | (2013.01) |
| *G06T 19/20* | (2011.01) |
| *G06T 19/00* | (2011.01) |
| *G06V 20/20* | (2022.01) |

(52) U.S. Cl.
CPC .............. *G06F 3/011* (2013.01); *G06F 3/017* (2013.01); *G06F 21/32* (2013.01); *G06T 19/006* (2013.01); *G06T 19/20* (2013.01); *G06V 20/20* (2022.01)

(58) Field of Classification Search
None
See application file for complete search history.

(56) References Cited

U.S. PATENT DOCUMENTS

| | | |
|---|---|---|
| 8,231,465 B2 | 7/2012 | Yee |
| 8,694,553 B2 | 4/2014 | Shuster |
| 8,878,846 B1 | 11/2014 | Francis |
| 8,930,195 B1 | 1/2015 | LeBeau |
| 9,781,342 B1 | 10/2017 | Turley |
| 10,026,226 B1 | 7/2018 | Lotto |

(Continued)

FOREIGN PATENT DOCUMENTS

| | | |
|---|---|---|
| KR | 10-2012-0007215 A | 1/2012 |
| KR | 10-2012-0042253 | 5/2012 |

(Continued)

OTHER PUBLICATIONS

Szemenyei, Maiden, and Ferenc Vajda. "3d object detection and scene optimization for tangible augmented reality." Periodica Polytechnica Electrical Engineering and Computer Science 62.2 (2018): 25-3. (Year: 2018).

(Continued)

*Primary Examiner* — Martin Mushambo

(57) ABSTRACT

Systems, methods and apparatuses of virtual object control of a physical device and/or physical device control of a virtual object are disclosed. In one aspect, embodiments of the present disclosure include a method, which may be implemented on a system, to present a depiction of a virtual object in the augmented reality environment. In the method, one or more functions of the virtual object accessible in the augmented reality environment are used for control of a physical device.

18 Claims, 13 Drawing Sheets

(56) References Cited

U.S. PATENT DOCUMENTS

| | | |
|---|---|---|
| 10,339,721 B1 | 7/2019 | Dascola |
| 10,496,272 B1 | 12/2019 | Lonkar |
| 10,740,804 B2 | 8/2020 | Spivack |
| 10,904,374 B2 | 1/2021 | Spivack |
| 10,957,083 B2* | 3/2021 | Du .................. G06T 11/60 |
| 11,249,714 B2 | 2/2022 | Spivack |
| 2002/0099257 A1 | 7/2002 | Parker |
| 2002/0099679 A1 | 7/2002 | Usitalo |
| 2003/0158796 A1 | 8/2003 | Balent |
| 2005/0021472 A1 | 1/2005 | Gettman |
| 2008/0140494 A1 | 6/2008 | Charuk |
| 2008/0215415 A1 | 8/2008 | Willms |
| 2009/0061901 A1 | 3/2009 | Airasvuorj |
| 2009/0144105 A1 | 6/2009 | Blatchley |
| 2009/0234948 A1 | 9/2009 | Garbow |
| 2009/0259662 A1 | 10/2009 | Cragun |
| 2009/0300122 A1 | 12/2009 | Freer |
| 2010/0100487 A1 | 4/2010 | Lingafelt |
| 2010/0114662 A1 | 5/2010 | Jung |
| 2011/0007086 A1* | 1/2011 | Kim .................. G06T 11/001 345/581 |
| 2011/0251902 A1 | 10/2011 | Nagarajayya |
| 2012/0105473 A1 | 5/2012 | Bar-Zeev |
| 2012/0116728 A1 | 5/2012 | Shear |
| 2012/0154441 A1 | 6/2012 | Kim |
| 2012/0172131 A1 | 7/2012 | Boswell |
| 2012/0194541 A1 | 8/2012 | Kim |
| 2012/0218296 A1 | 8/2012 | Belimpasakis |
| 2012/0229508 A1 | 9/2012 | Wigdor |
| 2012/0239213 A1 | 9/2012 | Nagata |
| 2012/0249741 A1 | 10/2012 | Maciocci |
| 2012/0254858 A1 | 10/2012 | Moyers |
| 2012/0256954 A1 | 10/2012 | Soon-Shiong |
| 2012/0290366 A1 | 11/2012 | Giles |
| 2013/0083173 A1 | 4/2013 | Geisner |
| 2013/0135344 A1 | 5/2013 | Stirbu |
| 2013/0141419 A1 | 6/2013 | Mount |
| 2013/0211945 A1 | 8/2013 | Po-Ching |
| 2013/0263016 A1 | 10/2013 | Lehtlniemi |
| 2013/0286004 A1 | 10/2013 | McCulloch |
| 2013/0293468 A1 | 11/2013 | Perez |
| 2013/0293584 A1 | 11/2013 | Anderson |
| 2013/0336093 A1 | 12/2013 | Suvanto |
| 2014/0028712 A1 | 1/2014 | Keating |
| 2014/0047027 A1 | 2/2014 | Moyers |
| 2014/0059447 A1 | 2/2014 | Berk |
| 2014/0063060 A1 | 3/2014 | Maciocci |
| 2014/0063197 A1 | 3/2014 | Yamamoto |
| 2014/0071164 A1 | 3/2014 | Saklatvala |
| 2014/0100955 A1 | 4/2014 | Osotio |
| 2014/0100994 A1* | 4/2014 | Tatzel ............... G06Q 30/0276 705/27.1 |
| 2014/0100997 A1 | 4/2014 | Mayerle |
| 2014/0114845 A1 | 4/2014 | Rogers |
| 2014/0168121 A1* | 6/2014 | Chou .................. G06K 9/00912 345/173 |
| 2014/0184496 A1* | 7/2014 | Gribetz ................ G06F 3/011 345/156 |
| 2014/0208272 A1* | 7/2014 | Vats .................. G06T 19/20 715/852 |
| 2014/0337920 A1* | 11/2014 | Giobbi ................ G06F 21/34 726/3 |
| 2014/0361971 A1 | 12/2014 | Sala |
| 2014/0369558 A1 | 12/2014 | Holz |
| 2014/0372540 A1 | 12/2014 | Uhm |
| 2015/0005070 A1* | 1/2015 | Monahan ............. A63F 13/69 463/31 |
| 2015/0019983 A1* | 1/2015 | White .................. G06F 16/26 715/739 |
| 2015/0031440 A1 | 1/2015 | Desanti |
| 2015/0055821 A1 | 2/2015 | Fotland |
| 2015/0058102 A1 | 2/2015 | Christensen |
| 2015/0123966 A1 | 5/2015 | Newman |
| 2015/0130689 A1* | 5/2015 | Sugden ................ G06T 7/194 345/8 |
| 2015/0130836 A1* | 5/2015 | Anderson ............. G06T 19/006 345/633 |
| 2015/0187137 A1 | 7/2015 | Mullins |
| 2015/0206349 A1 | 7/2015 | Rosenthal |
| 2015/0213355 A1 | 7/2015 | Sharma |
| 2015/0254793 A1 | 9/2015 | Hastings |
| 2015/0263460 A1 | 10/2015 | Huang |
| 2015/0283460 A1* | 10/2015 | Huang ................ G06F 3/0346 345/158 |
| 2015/0302517 A1 | 10/2015 | Spivack |
| 2015/0302652 A1 | 10/2015 | Miller |
| 2015/0371447 A1 | 12/2015 | Yasutake |
| 2015/0378440 A1 | 12/2015 | Umlauf |
| 2016/0026253 A1 | 1/2016 | Bradski |
| 2016/0100034 A1 | 4/2016 | Miller |
| 2016/0133230 A1 | 5/2016 | Daniels |
| 2016/0134805 A1 | 5/2016 | Takahashi |
| 2016/0175715 A1 | 6/2016 | Ye |
| 2016/0203645 A1 | 7/2016 | Knepp |
| 2016/0217623 A1 | 7/2016 | Singh |
| 2016/0234643 A1 | 8/2016 | Crutchfield |
| 2016/0314609 A1 | 10/2016 | Taylor |
| 2016/0323332 A1 | 11/2016 | Welinder |
| 2016/0330522 A1 | 11/2016 | Newell |
| 2016/0335289 A1 | 11/2016 | Andrews |
| 2016/0342782 A1* | 11/2016 | Mullins .................. G06F 21/32 |
| 2017/0052507 A1 | 2/2017 | Poulos |
| 2017/0093780 A1 | 3/2017 | Lieb |
| 2017/0103584 A1 | 4/2017 | Vats |
| 2017/0123750 A1 | 5/2017 | Todasco |
| 2017/0154242 A1 | 6/2017 | Blanchflower |
| 2017/0178373 A1 | 6/2017 | Sarafa |
| 2017/0186232 A1 | 6/2017 | Dange |
| 2017/0193276 A1* | 7/2017 | Choi .................. G06F 21/445 |
| 2017/0193314 A1* | 7/2017 | Kim .................. G06F 21/32 |
| 2017/0243403 A1 | 8/2017 | Daniels |
| 2017/0244703 A1* | 8/2017 | Lee .................. H04W 12/065 |
| 2017/0316186 A1* | 11/2017 | Breitenfeld ......... G06F 21/6218 |
| 2017/0323266 A1 | 11/2017 | Seo |
| 2017/0366748 A1 | 12/2017 | Festa |
| 2018/0053267 A1 | 2/2018 | Penner |
| 2018/0068019 A1 | 3/2018 | Novikoff |
| 2018/0089869 A1 | 3/2018 | Bostick |
| 2018/0096362 A1 | 4/2018 | Kwan |
| 2018/0113594 A1 | 4/2018 | Alnatsheh |
| 2018/0145937 A1 | 5/2018 | Choi |
| 2018/0190003 A1 | 7/2018 | Upadhyay |
| 2018/0190166 A1 | 7/2018 | Salmirnaa |
| 2018/0196585 A1* | 7/2018 | Densham ............. H05B 47/125 |
| 2018/0210643 A1 | 7/2018 | Ghassabian |
| 2018/0231921 A1 | 8/2018 | Smith |
| 2018/0268589 A1 | 9/2018 | Grant |
| 2018/0308287 A1 | 10/2018 | Daniels |
| 2018/0330542 A1 | 11/2018 | Bharti |
| 2018/0349088 A1 | 12/2018 | Leppanen |
| 2018/0350146 A1 | 12/2018 | Gervasio |
| 2018/0365883 A1 | 12/2018 | Fillhardt |
| 2018/0365897 A1 | 12/2018 | Pahud |
| 2018/0365898 A1 | 12/2018 | Costa |
| 2019/0005724 A1 | 1/2019 | Pahud |
| 2019/0034765 A1* | 1/2019 | Kaehler ............... G06N 3/0481 |
| 2019/0080172 A1 | 3/2019 | Zheng |
| 2019/0102946 A1 | 4/2019 | Spivack |
| 2019/0107935 A1 | 4/2019 | Spivack |
| 2019/0107990 A1 | 4/2019 | Spivack |
| 2019/0107991 A1 | 4/2019 | Spivack |
| 2019/0108558 A1 | 4/2019 | Spivack |
| 2019/0108578 A1 | 4/2019 | Spivack |
| 2019/0108580 A1 | 4/2019 | Spivack |
| 2019/0108682 A1 | 4/2019 | Spivack |
| 2019/0108686 A1 | 4/2019 | Spivack |
| 2019/0132700 A1 | 5/2019 | Yokoyama |
| 2019/0179405 A1 | 6/2019 | Sun |
| 2019/0188450 A1 | 6/2019 | Spivack |
| 2019/0236259 A1* | 8/2019 | Remillet ............... G06F 21/32 |
| 2019/0253542 A1 | 8/2019 | Fan |
| 2019/0260870 A1 | 8/2019 | Spivack |

(56) References Cited

U.S. PATENT DOCUMENTS

| | | | |
|---|---|---|---|
| 2019/0266404 | A1 | 8/2019 | Spivack |
| 2019/0295298 | A1 | 9/2019 | VanBlon |
| 2019/0318076 | A1 | 10/2019 | Chun |
| 2019/0355050 | A1 | 11/2019 | Geisier |
| 2019/0391637 | A1 | 12/2019 | Taylor |
| 2019/0392085 | A1 | 12/2019 | Ragan |
| 2020/0019295 | A1 | 1/2020 | Spivack |
| 2020/0021784 | A1 | 1/2020 | Grusche |
| 2020/0068133 | A1 | 2/2020 | Spivack |
| 2020/0294311 | A1 | 9/2020 | Holz |
| 2021/0026441 | A1 | 1/2021 | Spivack |
| 2021/0110608 | A1 | 4/2021 | Elby |
| 2021/0074068 | A1 | 11/2021 | Spivack |

FOREIGN PATENT DOCUMENTS

| | | | |
|---|---|---|---|
| KR | 10-2014-0043522 A | | 4/2014 |
| KR | 10-2014-0088578 | | 7/2014 |
| KR | 10-1693631 B | | 1/2017 |
| WO | 2017093605 | | 6/2017 |
| WO | 2019023659 | | 1/2019 |
| WO | 2019028159 | | 2/2019 |
| WO | 2019028479 | | 2/2019 |
| WO | 2019055703 | | 3/2019 |
| WO | 2019079826 | | 4/2019 |
| WO | 2020018431 | | 1/2020 |

OTHER PUBLICATIONS

IPRP for Application No. PCT/US19/41821, Date of filing: Jul. 15, 2019, Applicant: Magical Technologies, LLC, dated Nov. 21, 2019, 8 pages.
English translation of KR 2012-0042253.
English translation of KR 2014-0088578.
English translation of KR 101693631 Bl.
Enlish translation of KR 20120007215 A.
English translation of KR 20140043522 A.
Previtali et al. ("A Flexible Methodology for Outdoor/Indoor Building Reconstruction From Occluded Point Clouds", ISRS Annals of the Photogrammetry, Remote Sensing and Spatial Information Sciences, vol. II-3, 2014 ISPRS Technical Commission III Symposium, Sep. 5-7, 2014, Zurich, Switzerland) (Year: 2014).
IPRP for Application No. PCT/US18/56951, Date of filing: Oct. 22, 2018, Applicant: Magical Technologies, LLC, dated Apr. 28, 2020, 16 pages.
International Search Report & Written Opinion for Application No. PCT/US18/44214, Date of filing; Jul. 27, 2018, Applicant: Magical Technologies, LLC, dated Nov. 23, 2018, 20 pages.
International Search Report & Written Opinion for Application No. PCT/US18/44844, Date of filing: Aug. 1, 2018, Applicant: Magical Technologies, LLC, dated Nov. 16, 2018, 13 pages.
International Search Report & Written Opinion for Application No. PCT/US18/45450, Date of filing: Aug. 6, 2018, Applicant: Magical Technologies, LLC, dated Jan. 2, 2019, 20 pages.
International Search Report & Written Opinion for Application No. PCT/US18/50952, Date of filing; Sep. 13, 2018, Applicant: Magical Technologies, LLC, dated Mar. 15, 2019, 22 pages.
International Search Report & Written Opinion for Application No. PCT/US18/56951, Date of filing: Oct. 22, 2018, Applicant: Magical Technologies, LLC, dated Feb. 22, 2019, 17 pages.
International Search Report & Written Opinion for Application No. PCT/US19/41821, Date of filing; Jul. 15, 2019, Applicant; Magical Technologies, LLC, dated Nov. 21, 2019, 9 pages.
"Fujifilm balloon" (downloaded @https://web.archive.org/web/20150514181842/http://www.imageafter.com/image.php?image=b2ain/ehicle3002.jpg, (Year: 2015).
"Print Ad Rates" downloaded @ https://web.archive.org/web/20160319060126/https://diverseeducation.com/media-kit/print-ad-rates/,available online since Mar. 14, 2016 (Year: 2016).

Mehdi Mekni et al., 'Augmented Reality Applications, Challenges and Future Trends', Applied computer arid applied computational science, Apr. 25, 2014, pp. 205-214.
IPRP for Application No. PCT/US18/44214, Date of filing: Jul. 27, 2018, Applicant: Magical Technologies, LLC, dated Jan. 28, 2020, 18 pages.
IPRP for Application No. PCT/US18/44844, Date of filing: Aug. 1, 2018, Applicant: Magical Technologies, LLC, dated Feb. 4, 2020, 11 pages.
IPRP for Application No. PCT/US18/45450, Date of filing: Aug. 6, 2018, Applicant: Magical Technologies, LLC, dated Feb. 13, 2020, 10 pages.
International Search Report & Written Opinion for Application No. PCT/US18/50952, Date of filing: Sep. 13, 2018, Applicant: Magical Technologies, LLC, dated Mar. 17, 2020, 12 pages.
U.S. Appl. No. 16/048,190, U.S. Pat. No. 10/740,804, filed Jul. 27, 2018 Aug. 11,2020, Systems, Methods and Apparatuses of Seamless Integration of Augmented, Alternate, Virtual, and/or Mixed Realities with Physical Realities for Enhancement of Web, Mobile and/or Other Digital Experiences.
U.S. Appl. No. 16/048,195, filed Jul. 27, 2018, Systems, methods and apparatuses to facilitate physical and non-physical interaction/action/reactions between alternate realities.
U.S. Appl. No. 16/048,1999, filed Jul. 27, 2018, Systems, Methods and Apparatuses of Multidimensional Mapping of Universal Locations or Location Ranges for Alternate or Augmented Digital Experiences.
U.S. Appl. No. 16/048,205, filed Jul. 27, 2018, Systems, Methods and Apparatuses to Create Real World Value and Demand for Virtual Spaces Via an Alternate Reality Environment.
U.S. Appl. No. 16/792,252, filed Feb. 16, 2020, Seamless Integration of Augmented, Alternate, Virtual, and/or Mixed Realities with Physical Realities for Enhancement of Web, Mobile and/or Other Digital Experiences.
U.S. Appl. No. 16/052,720, filed Aug. 2, 2018, Systems, Methods and Apparatuses to Facilitate Trade or Exchange of Virtual Real-Estate Associated With a Physical Space.
U.S. Appl. No. 17/502,127, filed Oct. 15, 2021, Systems, Methods and Apparatuses to Facilitate Trade or Exchange of Virtual Real-Estate Associated With a Physical Space.
U.S. Appl. No. 16/056,507, filed Aug. 6, 2018, Systems, Methods and Apparatuses for Deployment and Targeting of Context-Aware Virtual Objects and/or Behavior Modelling of Virtual Objects Based on Physical Principles.
U.S. Appl. No. 16/130,499, filed Sep. 13, 2018, Systems and Methods of Shareable Virtual Objects and Virtual Objects As Message Objects to Facilitate Communications Sessions in an Augmented Reality Environment.
U.S. Appl. No. 16/130,541, filed Sep. 13, 2018, Systems and Methods of Virtual Billboarding and Collaboration Facilitation in an Augmented Reality Environment.
U.S. Appl. No. 16/130,582, filed Sep. 13, 2018, Systems and Methods of Rewards Object Spawning and Augmented Reality Commerce Platform Supporting Multiple Seller Entities.
U.S. Appl. No. 16/853,815, filed Apr. 21, 2020, Systems, Methods and Apparatuses of Digital Assistants in an Augmented Reality Environment and Local Determination of Virtual Object Placement and Apparatuses of Single or Multi-directional Lens as Portals Between a Physical World and a Digital World Component of the Augmented Reality Environment.
U.S. Appl. No. 16/181,478, filed Nov. 6, 2018, Systems, Methods and Apparatuses for Deployment of Virtual Objects based on content segment consumed in a target environment.
U.S. Appl. No. 16/260,783, filed Jan. 29, 2019, Systems, Methods and Apparatuses to Generate a Fingerprint of a Physical Location for Placement of Virtual Objects.
U.S. Appl. No. 16/252,886, U.S. Pat. No. 10,904,374, filed Jan. 21, 2019 Jan. 26, 2021, Systems, Methods and Apparatuses to Facilitate Gradual or Instantaneous Adjustment in Levels of Perceptibility of Virtual Objects or Reality Object in a Digital Scene.

(56) References Cited

OTHER PUBLICATIONS

U.S. Appl. No. 17/136,062, filed Dec. 29, 2020, Systems, Methods and Apparatuses to Facilitate Gradual or Instantaneous Adjustment in Levels of Perceptibility of Virtual Objects or Reality Object in a Digital Scene.
U.S. Appl. No. 16/511,186, filed Jul. 15, 2019, Systems and Methods to Administer a Chat Session in an Augmented Reality Environment.
U.S. Appl. No. 16/547,817, filed Aug. 22, 2019, Edge-Facing Camera Enabled Systems, Methods and Apparatuses.
U.S. Appl. No. 16/806,162, filed Mar. 2, 2020, Virtual Object Control of a Physical Device and/or Physical Device Control of a Virtual Object.

* cited by examiner

VIRTUAL OBJECT CONTROL OF A PHYSICAL DEVICE AND/OR PHYSICAL DEVICE CONTROL OF A VIRTUAL OBJECT

CLAIM OF PRIORITY

This application claims the benefit of:

*U.S. Provisional Application No. 62/813,216, filed Mar. 4, 2019 and entitled "VIRTUAL OBJECT CONTROL OF A PHYSICAL OBJECT AND PHYSICAL OBJECT CONTROL OF A VIRTUAL OBJECT," (8014.US00), the contents of which are incorporated by reference in their entirety.

TECHNICAL FIELD

The disclosed technology relates generally to systems, methods and apparatuses of virtual object control of a physical device and/or physical device control of a virtual object.

BACKGROUND

The advent of the World Wide Web and its proliferation in the 90's transformed the way humans conduct business, personal lives, consume/communicate information and interact with or relate to others. A new wave of technology is on the cusp of the horizon to revolutionize our already digitally immersed lives.

DETAILED DESCRIPTION

Figure 1:
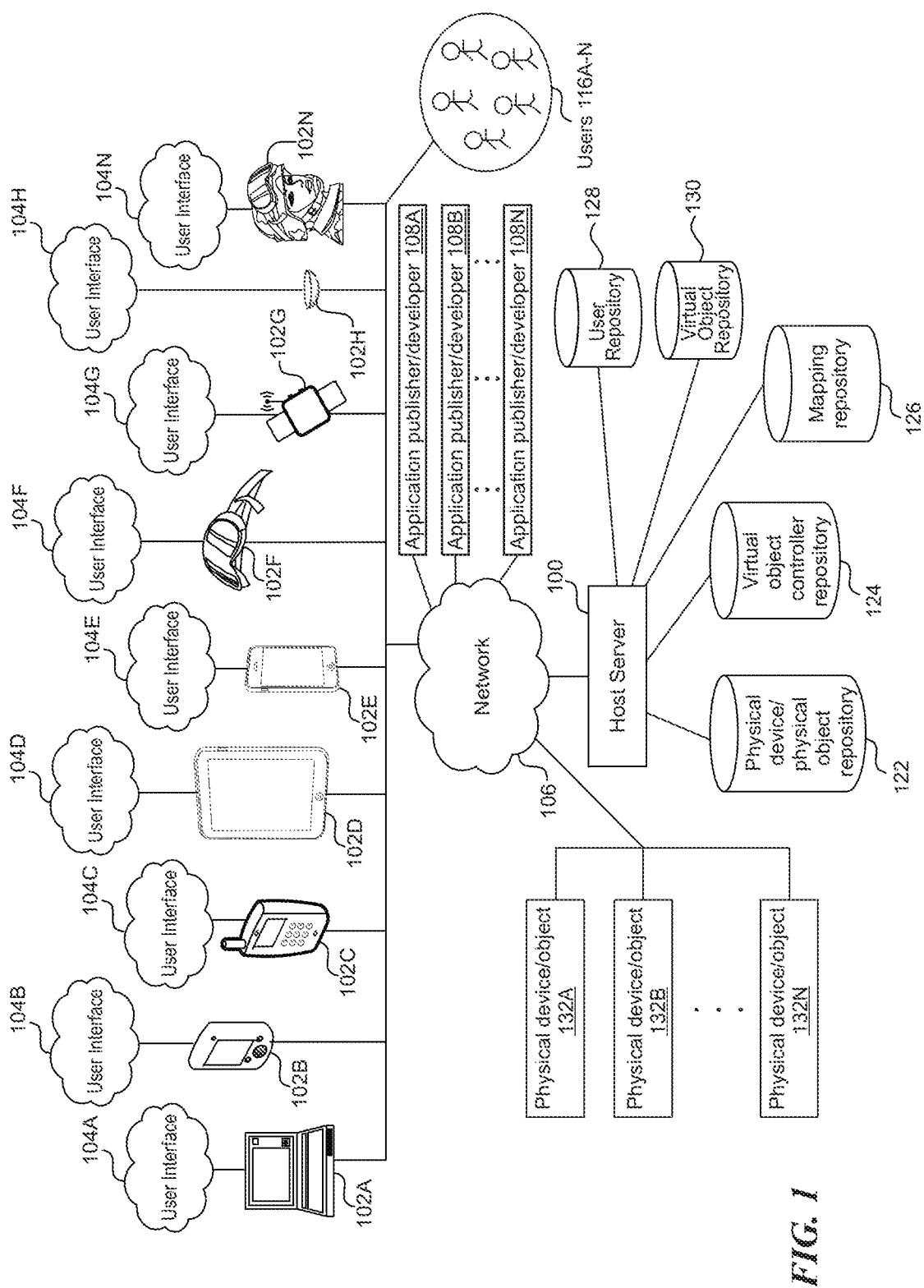
FIG. 1 illustrates an example block diagram of a host server able to facilitate virtual object control of a physical device and/or physical device control of a virtual object, in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Digital Objects

The digital objects presented by the disclosed system in a digital environment, can, for instance, include:

a) 'virtual objects' which can include any computer generated, computer animated, digitally rendered/reproduced, artificial objects/environment and/or synthetic objects/environment. Virtual objects need not have any relation or context to the real world or its phenomena or its object places or things. Virtual objects generally also include the relative virtual objects or 'simulated objects' as described below in b).

b) 'Relative virtual objects' or also referred to as 'simulated objects' can generally include virtual objects/environments that augment or represent real objects/environments of the real world. Relative virtual objects (e.g., simulated objects) generally further include virtual objects that are temporally or spatially relevant and/or has any relation, relevance, ties, correlation, anti-correlation, context to real world phenomenon, concepts or its objects, places, persons or things; 'relative virtual objects' or 'simulated objects' can also include or have relationships to, events, circumstances, causes, conditions, context, user behavior or profile or intent, nearby things, other virtual objects, program state, interactions with people or virtual things or physical things or real or virtual environments, real or virtual physical laws, game mechanics, rules. In general 'relative virtual objects' can include any digital object that appears, disappears, or is generated, modified or edited based on any of the above factors.

c) 'Reality objects' or 'basic reality objects' which can perceptibly (e.g., visually or audibly) correspond to renderings or exact/substantially exact reproductions of reality itself. Reality includes tangibles or intangible in the real world. Such renderings or reproductions can include by way of example, an image, a (screenshot) shot, photo, video, live stream of a physical scene and/or its visible component or recordings or (live) stream of an audible component, e.g., sound of an airplane, traffic noise, Niagara falls, birds chirping.

The disclosed system (e.g. host server 100 of FIG. 1 and/or host server 300 of FIG. 3A-3B) can depict/present/augment, via a user device any combination/mixture of: virtual objects (including 'relative virtual objects') and reality objects (or, also referred to as 'basic reality objects'). Any mixture of such objects can be depicted in a digital environment (e.g., via visible area or user-perceptible area on a display or device, or a projection in the air/space).

Embodiments of the present disclosure further enable and facilitate adjustment and selection of the level/degree of perceptibility amongst the objects of varying levels of 'virtualness.' by a user, by a system, a platform or by any given application/software component in a given system.

Specifically, innovative aspects of the present disclosure include facilitating selection or adjustment of perceptibility (human perceptibility) amongst the virtual objects, reality objects, and/or relative virtual objects (e.g., simulated objects) in a digital environment (e.g., for any given scene or view). This adjustment and selection mechanism affects the virtualness of any given digital environment, with increased perceptibility of virtual objects generally corresponding to a higher virtualness level, with decreased perceptibility of virtual objects corresponding to a lower virtualness level. Similarly, decreased perceptibility of reality objects corresponds to increased virtualness and increased perceptibility of reality objects corresponds generally to decreased virtualness.

In one example embodiment of the present disclosure, opacity is used to adjust various components or objects in a digital environment can be thought of or implemented as a new dimension in a platform or user interface like window size and window location.

Embodiments of the present disclosure can further include systems, methods and apparatuses of platforms (e.g., as hosted by the host server 100 as depicted in the example of FIG. 1) for deployment and targeting of context-aware virtual objects and/or behavior modeling of virtual objects based on physical laws or principle. Further embodiments relate to how interactive virtual objects that correspond to content or physical objects in the physical world are detected and/or generated, and how users can then interact with those virtual objects, and/or the behavioral characteristics of the virtual objects, and how they can be modeled. Embodiments of the present disclosure can further include processes that augmented reality data (such as a label or name or other data) with media content, media content segments (digital, analog, or physical) or physical objects. Yet further embodiments of the present disclosure include a platform (e.g., as hosted by the host server 100 as depicted in the example of FIG. 1) to provide an augmented reality (AR) workspace in a physical space, where a virtual object can be rendered as a user interface element of the AR workspace.

Embodiments of the present disclosure can further include systems, methods and apparatuses of platforms (e.g., as hosted by the host server 100 as depicted in the example of FIG. 1) for managing and facilitating transactions or other activities associated with virtual real-estate (e.g., or digital real-estate). In general, the virtual or digital real-estate is associated with physical locations in the real world. The platform facilitates monetization and trading of a portion or portions of virtual spaces or virtual layers (e.g., virtual real-estate) of an augmented reality (AR) environment (e.g., alternate reality environment, mixed reality (MR) environment) or virtual reality VR environment.

In an augmented reality environment (AR environment), scenes or images of the physical world is depicted with a virtual world that appears to a human user, as being superimposed or overlaid of the physical world. Augmented reality enabled technology and devices can therefore facilitate and enable various types of activities with respect to and within virtual locations in the virtual world. Due to the inter connectivity and relationships between the physical world and the virtual world in the augmented reality environment, activities in the virtual world can drive traffic to the corresponding locations in the physical world. Similarly, content or virtual objects (VOBs) associated with busier physical locations or placed at certain locations (e.g., eye level versus other levels) will likely have a larger potential audience.

By virtue of the inter-relationship and connections between virtual spaces and real world locations enabled by or driven by AR, just as there is a value to real-estate in the real world locations, there can be inherent value or values for the corresponding virtual real-estate in the virtual spaces. For example, an entity who is a right holder (e.g., owner, renter, sub-letter, licensor) or is otherwise associated a region of virtual real-estate can control what virtual objects can be placed into that virtual real-estate.

The entity that is the rightholder of the virtual real-state can control the content or objects (e.g., virtual objects) that can be placed in it, by whom, for how long, etc. As such, the disclosed technology includes a marketplace (e.g., as run by server 100 of FIG. 1) to facilitate exchange of virtual real-estate (VRE) such that entities can control object or content placement to a virtual space that is associated with a physical space.

Embodiments of the present disclosure can further include systems, methods and apparatuses of seamless integration of augmented, alternate, virtual, and/or mixed realities with physical realities for enhancement of web, mobile and/or other digital experiences. Embodiments of the present disclosure further include systems, methods and apparatuses to facilitate physical and non-physical interaction/action/reactions between alternate realities. Embodiments of the present disclosure also systems, methods and apparatuses of multidimensional mapping of universal locations or location ranges for alternate or augmented digital experiences. Yet further embodiments of the present disclosure include systems, methods and apparatuses to create real world value and demand for virtual spaces via an alternate reality environment.

The disclosed platform enables and facilitates authoring, discovering, and/or interacting with virtual objects (VOBs). One example embodiment includes a system and a platform that can facilitate human interaction or engagement with virtual objects (hereinafter, 'VOB,' or 'VOBs') in a digital realm (e.g., an augmented reality environment (AR), an alternate reality environment (AR), a mixed reality environment (MR) or a virtual reality environment (VR)). The human interactions or engagements with VOBs in or via the disclosed environment can be integrated with and bring utility to everyday lives through integration, enhancement or optimization of our digital activities such as web browsing, digital (online, or mobile shopping) shopping, socializing (e.g., social networking, sharing of digital content, maintaining photos, videos, other multimedia content), digital communications (e.g., messaging, emails, SMS, mobile communication channels, etc.), business activities (e.g., document management, document procession), business processes (e.g., IT, HR, security, etc.), transportation, travel, etc.

The disclosed innovation provides another dimension to digital activities through integration with the real world environment and real world contexts to enhance utility, usability, relevancy, and/or entertainment or vanity value through optimized contextual, social, spatial, temporal awareness and relevancy. In general, the virtual objects depicted via the disclosed system and platform. can be contextually (e.g., temporally, spatially, socially, user-specific, etc.) relevant and/or contextually aware. Specifically, the virtual objects can have attributes that are associated with or relevant real world places, real world events, humans, real world entities, real world things, real world objects, real world concepts and/or times of the physical world, and thus its deployment as an augmentation of a digital experience provides additional real life utility.

Note that in some instances, VOBs can be geographically, spatially and/or socially relevant and/or further possess real life utility. In accordance with embodiments of the present disclosure, VOBs can be or appear to be random in appearance or representation with little to no real world relation and have little to marginal utility in the real world. It is possible that the same VOB can appear random or of little use to one human user while being relevant in one or more ways to another user in the AR environment or platform.

The disclosed platform enables users to interact with VOBs and deployed environments using any device (e.g., devices 102A-N in the example of FIG. 1), including by way of example, computers, PDAs, phones, mobile phones, tablets, head mounted devices, goggles, smart watches, monocles, smart lens, smart watches and other smart apparel (e.g., smart shoes, smart clothing), and any other smart devices.

In one embodiment, the disclosed platform includes an information and content in a space similar to the World Wide Web for the physical world. The information and content can be represented in 3D and or have 360 or near 360 degree views. The information and content can be linked to one another by way of resource identifiers or locators. The host server (e.g., host server 100 as depicted in the example of FIG. 1) can provide a browser, a hosted server, and a search engine, for this new Web.

Embodiments of the disclosed platform enables content (e.g., VOBs, third party applications, AR-enabled applications, or other objects) to be created and placed into layers (e.g., components of the virtual world, namespaces, virtual world components, digital namespaces, etc.) that overlay geographic locations by anyone, and focused around a layer that has the highest number of audience (e.g., a public layer). The public layer can in some instances, be the main discovery mechanism and source for advertising venue for monetizing the disclosed platform.

In one embodiment, the disclosed platform includes a virtual world that exists in another dimension superimposed on the physical world. Users can perceive, observe, access, engage with or otherwise interact with this virtual world via a user interface (e.g., user interface 104A-N as depicted in the example of FIG. 1) of client application (e.g., accessed via using a user device, such as devices 102A-N as illustrated in the example of FIG. 1).

One embodiment of the present disclosure includes a consumer or client application component (e.g., as deployed on user devices, such as user devices 102A-N as depicted in the example of FIG. 1) which is able to provide geo-contextual awareness to human users of the AR environment and platform. The client application can sense, detect or recognize virtual objects and/or other human users, actors, non-player characters or any other human or computer participants that are within range of their physical location, and can enable the users to observe, view, act, interact, react with respect to the VOBs.

Furthermore, embodiments of the present disclosure further include an enterprise application (which can be desktop, mobile or browser based application). In this case, retailers, advertisers, merchants or third party e-commerce platforms/sites/providers can access the disclosed platform through the enterprise application which enables management of paid advertising campaigns deployed via the platform.

Users (e.g., users 116A-N of FIG. 1) can access the client application which connects to the host platform (e.g., as hosted by the host server 100 as depicted in the example of FIG. 1). The client application enables users (e.g., users 116A-N of FIG. 1) to sense and interact with virtual objects ("VOBs") and other users ("Users"), actors, non-player characters, players, or other participants of the platform. The VOBs can be marked or tagged (by QR code, other bar codes, or image markers) for detection by the client application.

One example of an AR environment deployed by the host (e.g., the host server 100 as depicted in the example of FIG. 1) enables users to interact with virtual objects (VOBs) or applications related to shopping and retail in the physical world or online/e-commerce or mobile commerce. Retailers, merchants, commerce/e-commerce platforms, classified ad systems, and other advertisers will be able to pay to promote virtual objects representing coupons and gift cards in physical locations near or within their stores. Retailers can benefit because the disclosed platform provides a new way to get people into physical stores. For example, this can be a way to offer VOBs can are or function as coupons and gift cards that are available or valid at certain locations and times.

Additional environments that the platform can deploy, facilitate, or augment can include for example AR-enabled games, collaboration, public information, education, tourism, travel, dining, entertainment etc.

The seamless integration of real, augmented and virtual for physical places/locations in the universe is a differentiator. In addition to augmenting the world, the disclosed system also enables an open number of additional dimensions to be layered over it and, some of them exist in different spectra or astral planes. The digital dimensions can include virtual worlds that can appear different from the physical world. Note that any point in the physical world can index to layers of virtual worlds or virtual world components at that point. The platform can enable layers that allow non-physical interactions.

Figure 2A:
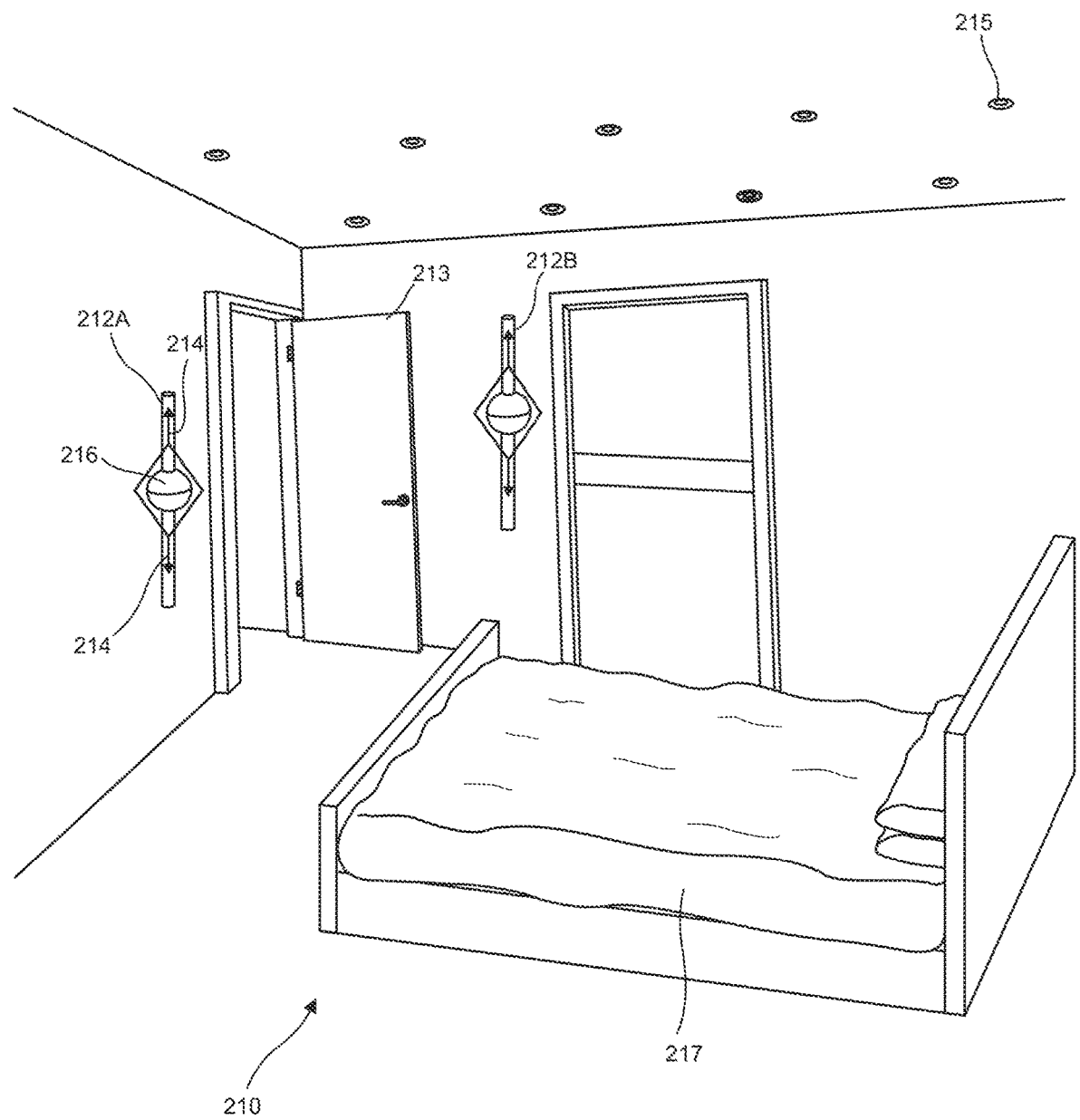
FIG. 2A-2B depict rooms in a real world environment showing examples of virtual objects usable to control physical devices, in accordance with embodiments of the present disclosure.
Figure 2B:
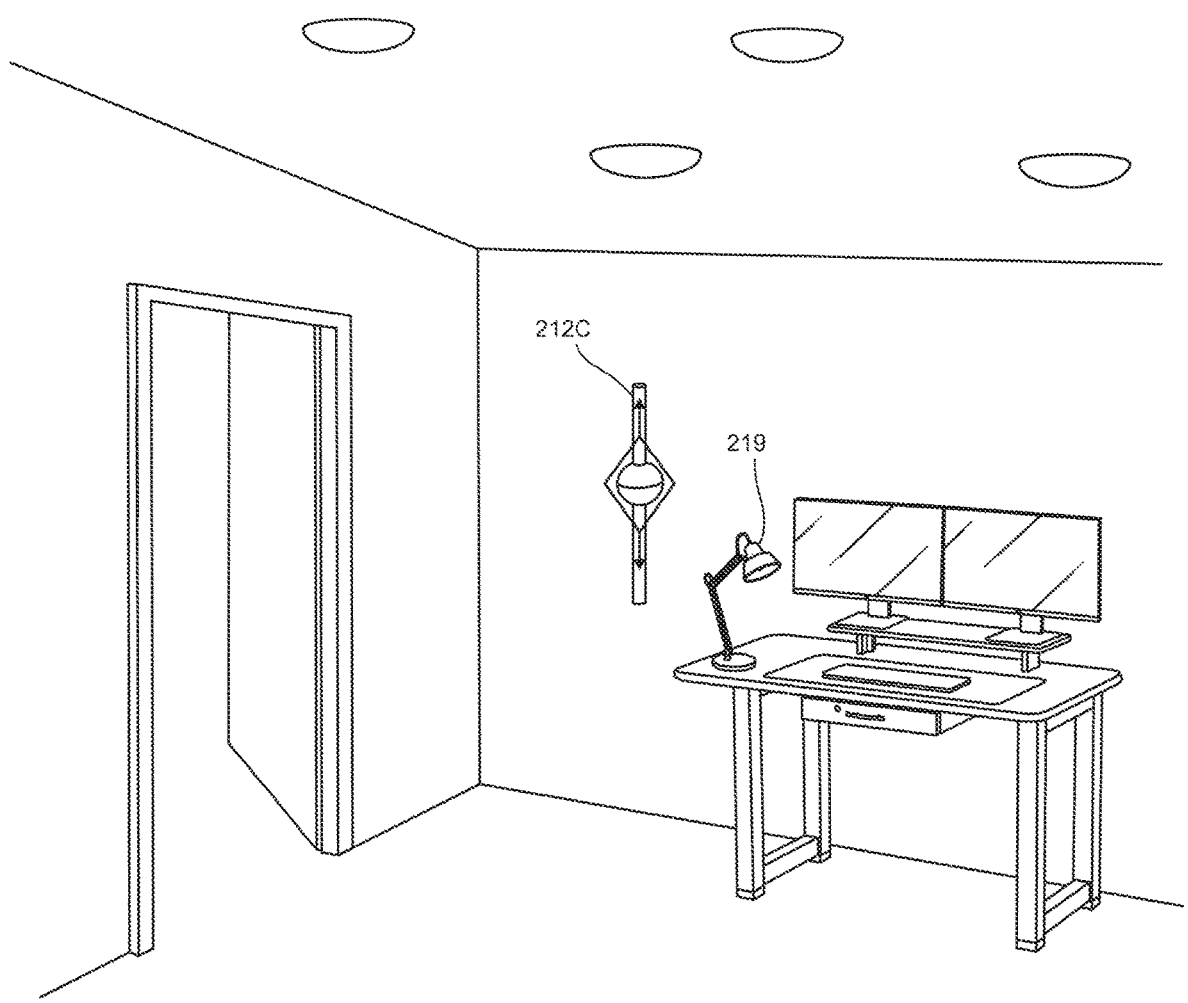
Figure 2C:
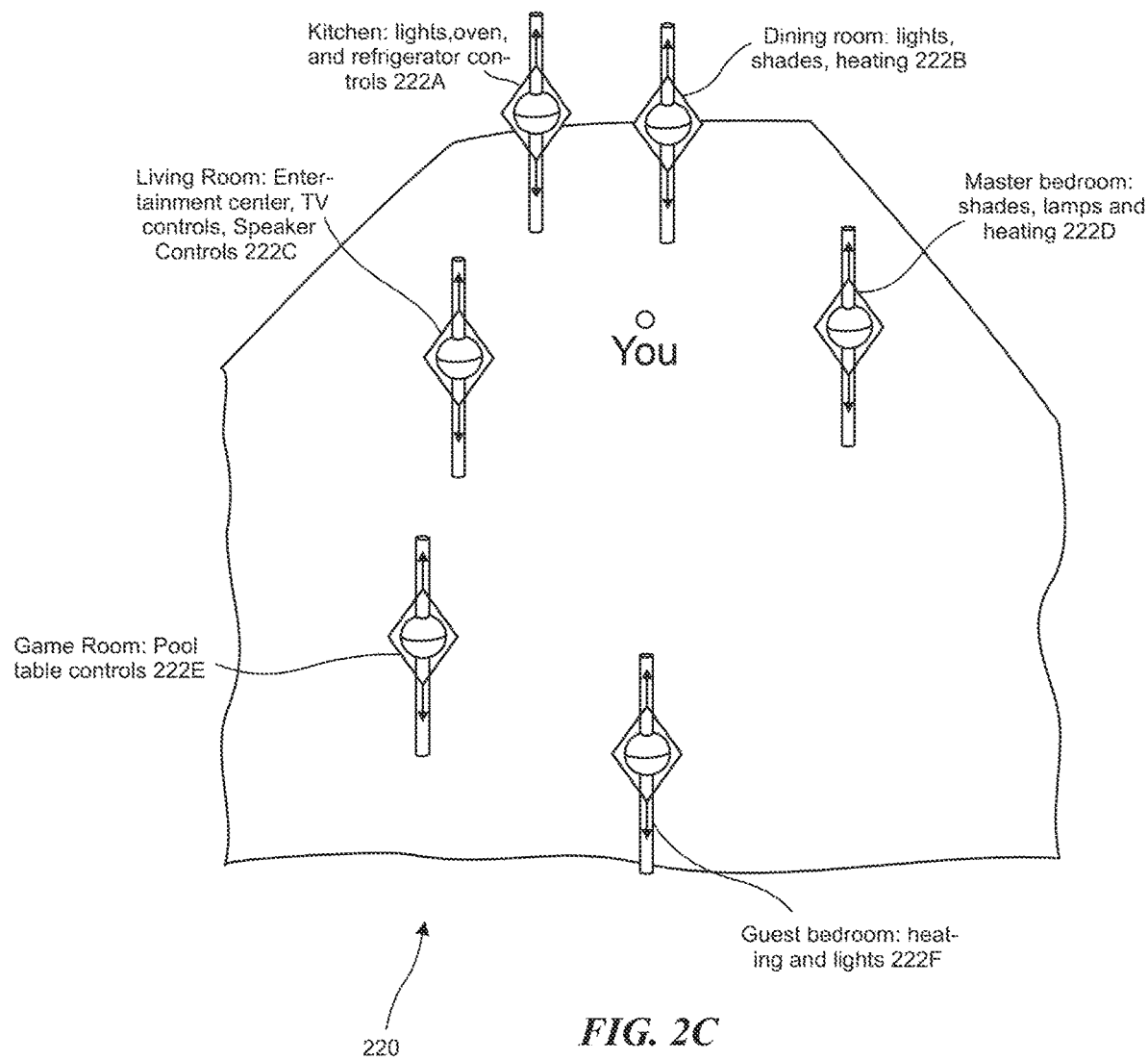
FIG. 2C depicts an example of a user interface with representations of virtual objects showing relative spatial locations of the virtual objects in a real world environment on a map of the real world environment, in accordance with embodiments of the present disclosure.
Figure 2D:
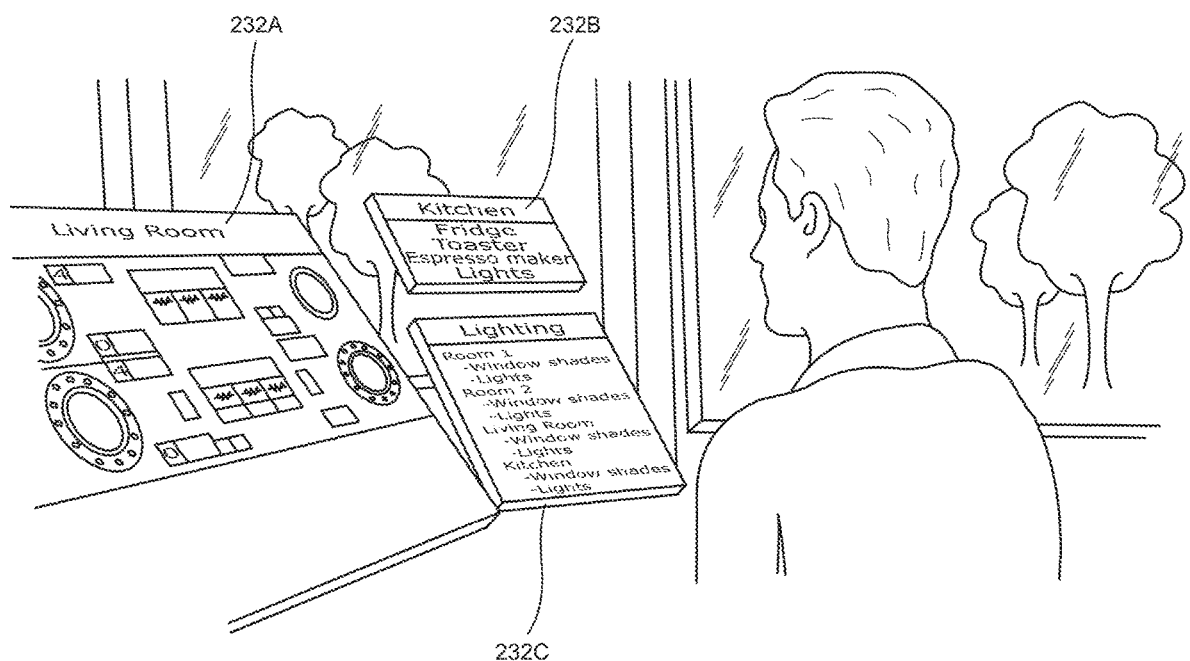
FIG. 2D depicts a room in the real world environment showing a virtual object depicted as an instrument panel having multiple virtual control objects, in accordance with embodiments of the present disclosure.
Figure 2E:
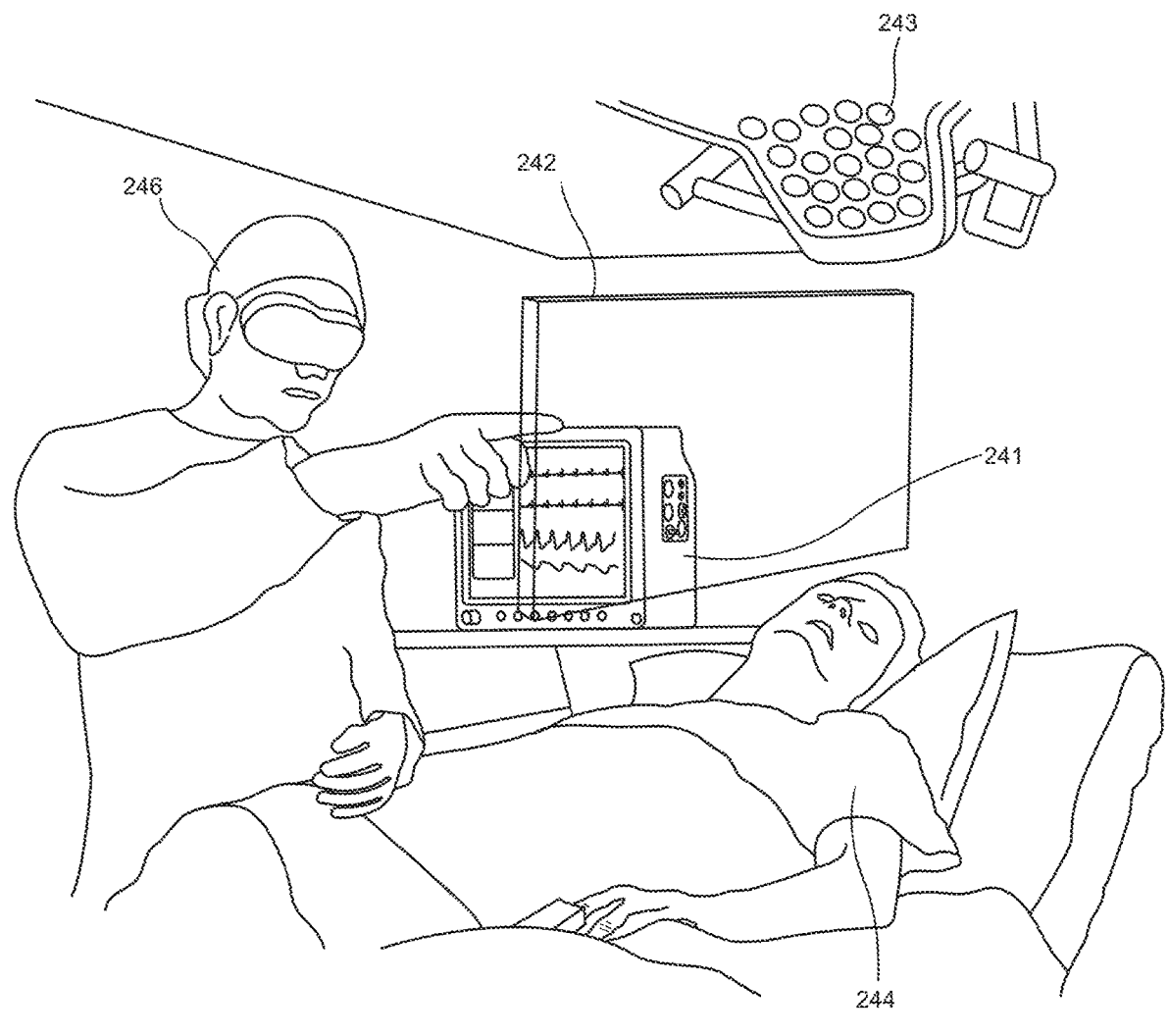
FIG. 2E depicts another room in a real world environment showing examples of a virtual object usable to control a physical device or physical devices, where the physical device is also usable to launch, access or control the virtual object in accordance with embodiments of the present disclosure.

Embodiments of the present disclosure include systems, methods and apparatuses of virtual object (e.g., virtual object(s) 212A/B/C of FIG. 2A-2B, or virtual object(s) 232A/B/C of FIG. 2D, and/or virtual object(s) 242 of FIG. 2E) control of a physical device or physical object (e.g., physical device/object 132A-N in the example of FIG. 1). The innovation can include:

A virtual object or virtual object (e.g., virtual controller object) which can be used to control a physical device or physical object.

The physical device can be connected to a computer and/or computer network.

A virtual object can include a controller ("virtual control object") that is rendered in augmented reality (AR) or virtual reality (VR), and depicted to users on a computer or computer network that is coupled to the physical device.

A user can interact in augmented reality or virtual reality with the virtual object or virtual controller object, to control the associated physical devices and/or physical objects.

Examples can further include, one or more of:

The virtual object (e.g., virtual control object) can include a button or trigger. For example, the virtual object can triggers a switch, parameter, or action of the associated physical device. For example a virtual light switch that triggers a physical light to turn on or off.

The virtual object is a setting. For example, the virtual object can enable a user (e.g., a human user and/or an artificial intelligence (AI) user) to virtually adjust a setting of the physical device to a value.

The virtual control object can include a joystick, steering wheel or other navigational control device. For example, the virtual object can control physical movement of the physical device, or part of the physical device such as a robot arm or an actuator.

The virtual object can include a biometric sensor. For example, the virtual object can prompt or enable a human user to provide their fingerprint, retinal scan, or eye print to a device and can depict and/or transmit the result of authentication to an associated physical device.

The virtual object can include a depiction of a robot or part of a robot. For example, a user (e.g., human and/or AI) can manipulate the virtual object and the associated physical device, which is a physical robot can mimic the movement and positioning of the virtual object as it is manipulated by the user.

The virtual object can include an instrument panel having a set of multiple virtual control objects. The virtual control objects can be related and using them in concert enables sophisticated control of a physical device. For example, a set of virtual joysticks, buttons, sliders, settings controllers that enable the control of a physical device.

Embodiments of the present disclosure also include systems, methods and apparatuses of Physical Object Control of a Virtual Object. This can entail all of the above, in reverse. For instance, using the physical devices (e.g., physical devices 132A-N of the example of FIG. 1) to control a virtual object in augmented reality and/or virtual reality.

Embodiments of the present disclosure further include systems and methods for adjusting levels of perceptibility of user-perceivable content/information via a platform which facilitates user interaction with objects in a digital environment. Aspects of the present disclosure include techniques to control or adjust various mixtures of perceptibility, in a digital environment, between the real world objects/content/environment and virtual objects/content/environment. Embodiments of the present disclosure further include control or adjustment of relative perceptibility between real things (e.g., real world objects/content/environment) and virtual things (e.g., virtual objects/content/environment).

The innovation includes for example, techniques to control or adjust various mixtures of perceptibility, in a digital environment, between the real world objects/content/environment and virtual objects/content/environment.

FIG. 1 illustrates an example block diagram of a host server 100 able to facilitate virtual object control of a physical device/object 132A-132N and/or physical device/object 132A-132N control of a virtual object, in accordance with embodiments of the present disclosure The client devices 102A-N can be any system and/or device, and/or any combination of devices/systems that is able to establish a connection with another device, a server and/or other systems. Client devices 102A-N each typically include a display and/or other output functionalities to present information and data exchanged between among the devices 102A-N and the host server 100.

For example, the client devices 102A-N can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, a wearable device, a head mounted device, a smart watch, a goggle, a smart glasses, a smart contact lens, and/or any other portable, mobile, hand held devices, etc. The input mechanism on client devices 102A-N can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), eye tracking, eye detection, pupil tracking/detection, or a combination of the above.

In some instances, the physical devices/objects 132A-N may be able to establish a connection with another device, a server and/or other systems. The physical devices 132A-N each may include a display and/or other output functionalities to present information and data exchanged between physical devices 132A-N, the client devices 102A-N and the host server 100. In some instances, the physical devices/objects 132A-N may not possess network capabilities or may not be network-enabled.

The physical devices 132A-N can be any physical object, any system and/or device, and/or any combination of devices/systems that have physical, mechanical, electrical, acoustical, magnetic, chemical, molecular and/or biological properties. In general, the physical devices 132A-N include devices and/or objects comprised of molecules, crystalline structures or cells of any dimensions that are physically present in the real world which can be touched, felt, seen, smelled, heard or otherwise perceived by human users.

The client devices 102A-N, physical devices 132A-N application publisher/developer 108A-N, its respective networks of users, a third party content provider (not shown), and/or promotional content server (not shown), can be coupled to the network 106 and/or multiple networks. In some embodiments, the client devices 102A-N, physical devices 132A-N, and/or host server 100 may be directly connected to one another. The alternate, augmented reality environments provided or developed by the application publisher/developer 108A-N can include any digital, online, web-based and/or mobile based environments including enterprise applications, health care, financial applications, entertainment, sporting, games, social networking, e-commerce, search, browsing, discovery, messaging, chatting, and/or any other types of activities (e.g., network-enabled activities).

In one embodiment, the host server 100 is operable to facilitate virtual object control of a physical device 132A-N and/or physical device 132A-N control of a virtual object (e.g., virtual object(s) 212A/B/C of FIG. 2A-2B, or virtual object(s) 232A/B/C of FIG. 2D, and/or virtual object(s) 242 of FIG. 2E).

In one embodiment, the disclosed framework includes systems and processes for enhancing the web and its features with augmented reality. Example components of the framework can include:

Browser (mobile browser, mobile app, web browser, etc.)

Servers and namespaces the host (e.g., host server 100 can host the servers and namespaces. The content (e.g, VOBs, any other digital object), applications running on, with, or integrated with the disclosed platform can be created by others (e.g., third party content provider, promotions content server and/or application publisher/developers 108A-N, etc.).

Advertising system (e.g., the host server 100 can run an advertisement/promotions engine through the platform and any or all deployed augmented reality, alternate reality, mixed reality or virtual reality environments)

Commerce (e.g., the host server 100 can facilitate transactions in the network deployed via any or all deployed augmented reality, alternate reality, mixed reality or virtual reality environments and receive a cut. A digital token or digital currency (e.g., crypto currency) specific to the platform hosted by the host server 100 can also be provided or made available to users.)

Search and discovery (e.g., the host server 100 can facilitate search, discovery or search in the network deployed via any or all deployed augmented reality, alternate reality, mixed reality or virtual reality environments)

Identities and relationships (e.g., the host server 100 can facilitate social activities, track identifies, manage, monitor, track and record activities and relationships between users 116A-N (users may be human users and/or AI users)).

Figure 3A:
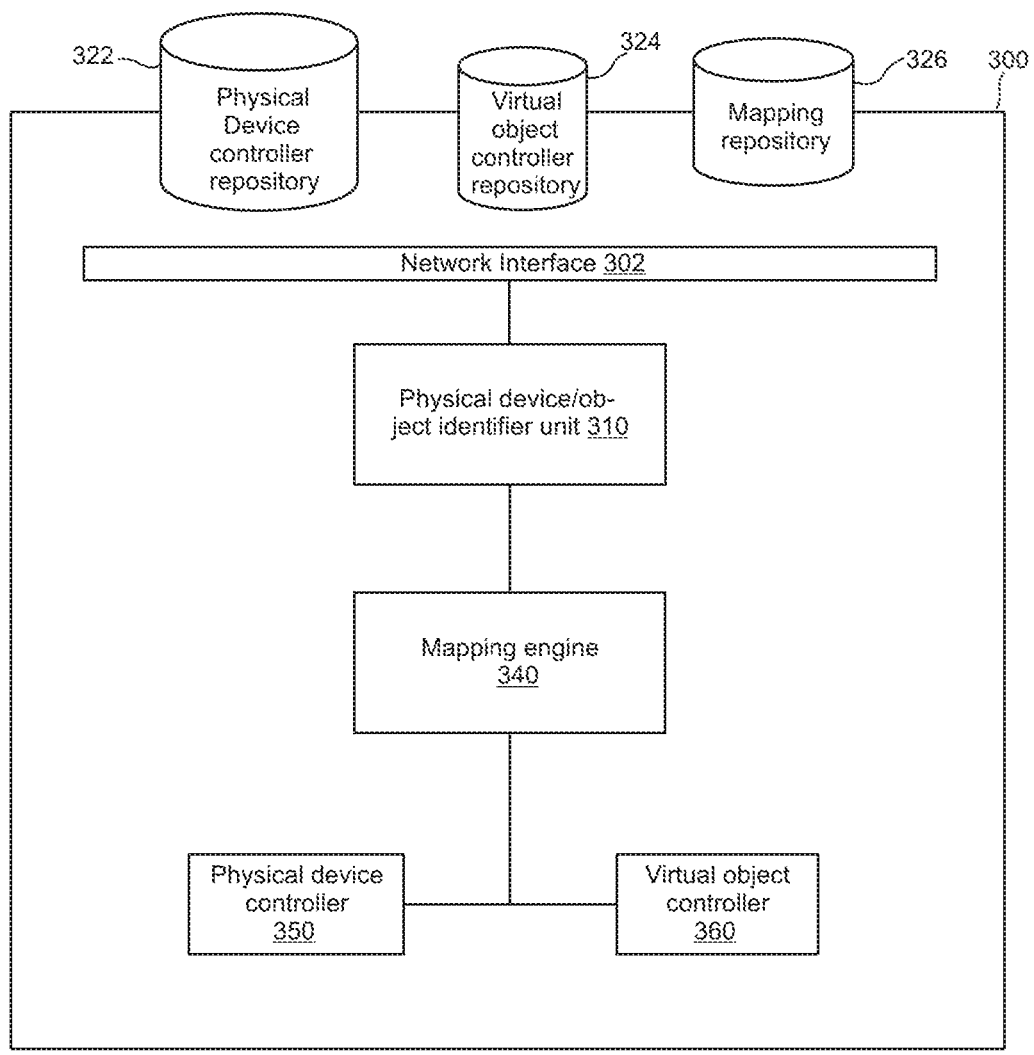
FIG. 3A depicts an example functional block diagram of a host server that facilitates virtual object control of a physical device and/or physical device control of a virtual object, in accordance with embodiments of the present disclosure.
Figure 3B:
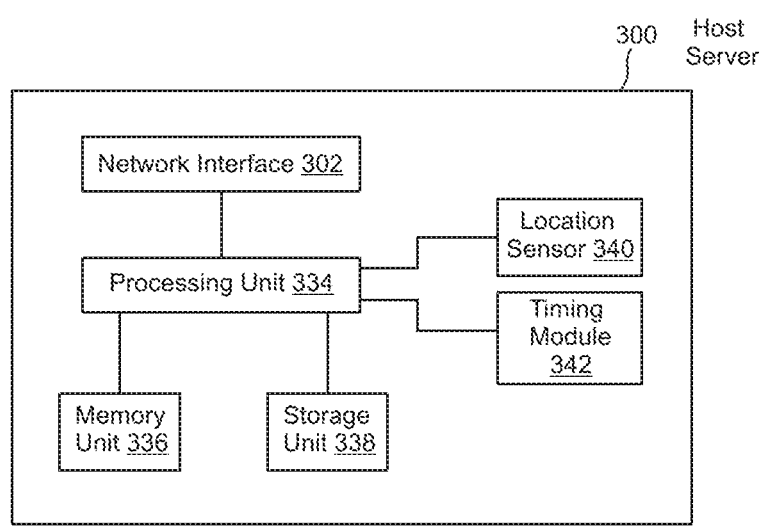
FIG. 3B depicts an example block diagram illustrating the components of the host server that facilitates virtual object control of a physical device and/or physical device control of a virtual object, in accordance with embodiments of the present disclosure.

Functions and techniques performed by the host server 100 and the components therein are described in detail with further references to the examples of FIG. 3A-3B.

In general, network 106, over which the client devices 102A-N, the physical devices 132A-N, the host server 100, and/or various application publisher/provider 108A-N, content server/provider (not shown), and/or promotional content server (not shown) communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102A-N, the physical devices 132A-N, and the host server 100 and may appear as one or more networks to the serviced systems and devices. In one embodiment, communications to and from the client devices 102A-N and/or the physical devices 132A-N, can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, 5G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 128, a virtual object repository 130, a mapping repository 126, a virtual object controller repository 124, and/or a physical device controller repository 122. The repositories can store software, descriptive data, images, system information, drivers, and/or any other data item utilized by other components of the host server 100, any of the physical devices 132A-N, and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., Concept-Base, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to generate, create and/or provide data to be stored in the user repository 128, the virtual object repository 130, the mapping repository 126, the virtual object controller repository 124, and/or the physical device controller repository 122. The user repository 128 can store user information, user profile information, demographics information, analytics, statistics regarding human users, user interaction, brands advertisers, virtual object (or 'VOBs'), access of VOBs, usage statistics of VOBs, ROI of VOBs, etc.

The virtual object repository 130 can store virtual objects and any or all copies of virtual objects. The VOB repository 130 can store virtual content or VOBs that can be retrieved for consumption or accessed in a target environment, where the virtual content or VOBs are contextually relevant. The VOB repository 130 can also include data which can be used to generate (e.g., generated in part or in whole by the host server 100 and/or locally at a client device 102A-N) contextually-relevant or aware virtual content or VOB(s).

The virtual object controller repository 124 can store virtual objects and any or all copies of virtual objects that can be used to control a physical object or physical device 132A-N. The VOB repository 130 can store virtual content or VOBs that can be retrieved for consumption or access in a target environment, where the virtual content or VOBs are contextually relevant. The VOB repository 130 can also include data which can be used to generate (e.g., generated in part or in whole by the host server 100 and/or locally at a client device 102A-N) contextually-relevant or aware virtual content or VOB(s).

The physical device/physical object repository 122 can store identifications of the physical devices 132A-N and/or physical objects which virtual objects can control or access. The physical device/physical object repository 122 can also store identifications of the physical devices 132A-N and/or physical objects which can control or access virtual objects. The mapping repository 126 can store mappings which track associations between virtual objects and physical devices/physical objects 132A-N. For example, mappings or trackers of which virtual object is controllable by which physical devices/physical objects can be stored. Mappings or trackers of which which physical devices/physical object is accessible and/or controlled by which virtual object can be stored. Such mappings may be updated by the physical devices/ objects 132, the virtual objects, the host server 100 and/or users 116A-N (e.g., human users and/or AI users).

FIG. 2A-2B depict rooms in a real world environment showing examples of virtual objects 212A/B/C usable to control physical devices (213/215/217/219), in accordance with embodiments of the present disclosure.

For example, in the physical bedroom 210 of FIG. 2A, there are virtual objects 212A and 212B. The virtual object 212A, can for example, include an on/off button 216, an 'up' switch and/or a 'down' switch 214. The dial 216 can also include a rotating controller. The virtual object 212A can be associated with any physical device or object in the physical bedroom 210. For example, the virtual object 212A can be associated with any of a door 213, overhead lights 215. The switches 214 can be used to control or change the locations/position of the door 213 to open the door or close the door 213, or any positions in between. Similarly, the dial control 216 may also be used to control a location or position of the door 213. The door 213 can be mechanically actuated through a network connection.

The virtual object 212A and/or virtual object 212B may also be associated with overhead lights 215 in the bedroom 210. For example, the virtual object 212A can be used to control the lights 215 by turning them on/off using the on/off button 216, to adjust the brightness or color temperatures (e.g., by dial 216 and/or up/down switches 214).

Similarly the virtual object (virtual object controller) 212A and/or 212B may be associated with a blanket/mattress 217 or its actuator. For example the virtual object controller 212A and/or 212B may be coupled to and able to control a mechanical actuator (spring or lever system) of the mattress 217, electric actuator of the mattress 217 or an electric blanket of 217.

In this example, the physical devices 213, 215 and/or 217 can be connected to a network or be network enabled such that signals can be sent to them via the virtual objects 212A and/or 212B.

Note that one virtual object (e.g., virtual object 212A) can control or be associated with one physical device (e.g., the door 213) or any number of multiple physical devices (e.g., door 212 and lights 215). The association between the virtual object 212A and any given physical device or physical devices may be fixed or assigned (e.g., by a system admin, by the device manufacturer, and/or by enterprise, or by another admin user, and/or anyone with permission). The association between the virtual object 212A and any given physical device or physical devices (e.g., physical devices 213, 215 and/or 217) may be changeable, adjustable, configurable and/or reconfigurable, similarly, by a system admin, by the device manufacturer, and/or by enterprise, or by another admin user), and/or any person//any system/any entity with permission.

Multiple virtual objects (e.g., 212a and 212B) can be mapped to or associated with any one physical device to control it or access it. For example, the virtual object 212A can be associated with both the door 213 and the lights 215. Features of the virtual object 212A can be presented or depicted based on the functions, features and/or attributes of the physical device with which it is associated.

The appearance or behavior of the virtual objects 212A and/or 212B can change based on the physical device it controls or is otherwise associated with. For example, the virtual object 212A or 212B can be rendered or depicted once the physical object(s) which it is associated with or controls is identified. The features/functionalities (e.g., control features 214 and/or 216) of the virtual object 212A are also rendered or depicted based on the identification of the physical object(s) which the virtual object 212A controls.

The observable, perceptible or accessible features/functionalities of the virtual object 212 can also change based on which physical device it is being used to access, or all features/functionalities may be always presented. Note that while controls 214 and 216 are illustrated in the virtual object 212A, additional or less controls can be included without deviating from the novel art of the disclosure.

Multiple virtual objects can be associated with and/or used to control a given physical device. Multiple virtual objects can be used to control all functions/features of a given physical device. For example virtual object 212A can be used to access and change the setting of brightness of lights 215. The virtual object 212A can also be used to access the change/adjust the color temperature setting of lights 215. Virtual object 212B can also have the same functionalities as virtual object 212A in accessing and controlling the brightness and the color temperature settings of lights 215.

In addition, different virtual objects can be used to control different functions or features of a given physical device. For example, the virtual object 212A can be used to control the brightness of lights 215 and virtual object 212B can be used to control the color temperature of the lights 215.

The virtual objects (e.g., 212A and/or 212B and/or 212C) can be used to actuate, access or control the physical devices/objects (213, 215, 217, and/or 219). The physical devices/objects of room 210 can also be used to actuate or launch instances of virtual objects (e.g., virtual objects 212A and/or 212B). For example a physical light switch associated with lights 215 may be actuated (physically or digitally) to launch the virtual object 212a/b/c or an instance of it. A physical button or switch associated with or connected to the lights 215 can be pressed, or flipped causing an associated virtual object (e.g., 212A and/or 212B and/or 212C) to appear or be rendered/depicted. If the virtual object (s) (e.g., 212A and/or 212B and/or 212C) were already depicted or observable, the rendering or appearance and/or behavior(s) of the virtual object (e.g., 212A and/or 212B and/or 212C) may now be updated for use with accessing, operating, controlling, or adjusting the lights 215. The physical button or switch may be on physical infrastructure (e.g., wall, floor, ceiling, etc.) or on a digital device (e.g., phone, laptop, other electronics).

An instance of the virtual object can be launched in an augmented reality environment in response to action detected by the physical device. Physical devices may also be able to detect certain physical actions performed on them causing the virtual object (e.g., 212A and/or 212B and/or 212C) to appear, be rendered and/or change observable behavior. For instance, the mattress/blanket 217 or the door 213 may detect touch (attempt to open/close/adjust), gesture, or be sat on, which causes the virtual object the virtual object (e.g., 212A and/or 212B and/or 212C) to appear, be rendered and/or change observable behavior. The physical devices (213, 215, 217, 219) may include various sensors (imaging, proximity, gesture, heat, voice, etc.) which can causes the virtual object the virtual object (e.g., 212A and/or 212B and/or 212C) to appear, be rendered and/or change observable behavior.

For example, the physical objects or devices can detect heat of a person nearby or motion/movement of a person nearby and/or gestures which can causes the virtual object the virtual object (e.g., 212A and/or 212B and/or 212C) to appear, be rendered and/or change observable behavior. The physical objects/devices may also have imaging or voice sensors such that various actions can be triggered or launched by identifying gesture commands and/or voice commands. The physical objects/devices can include any other type of sensors and in response to actuation of such sensors, cause the virtual object(s) (e.g., 212A and/or 212B and/or 212C) to appear, be rendered and/or change observable behavior. The sensors may be embedded in the physical devices respectively. The sensors may also be embedded into generic household devices, any electronic device (speakers, phones, lights, kitchen appliances), or in physical infrastructure, fixtures or furniture (e.g., walls, art, paintings, ceilings, floors, tables, countertops, lampshades, cabinets, desks, etc.).

FIG. 2C depicts an example of a user interface with representations (222A-F) of virtual objects showing relative spatial locations of the virtual objects (e.g., virtual object(s) 212A/B/C of FIG. 2A-2B, or virtual object(s) 232A/B/C of FIG. 2D, and/or virtual object(s) 242 of FIG. 2E) in a real world environment on a map 220 of the real world environment, in accordance with embodiments of the present disclosure.

The map 220 can also depict, specify, identify or list the physical devices or controls associated with each representation 222A-F of the virtual objects. For example representation 222A in the map 220 shows that the virtual object in the kitchen location can be associated with the lights, oven and/or the refrigerator controls. Representation 222E in the map 220 shows that the virtual object in the 'Game Room' location can be associated with the pool table controls.

FIG. 2D depicts a room 230 in the real world environment showing a virtual object depicted as an instrument panel having multiple virtual control objects 232a, 232b and 232c, in accordance with embodiments of the present disclosure.

For example, virtual object 232A can include charts, graphs, tables or displays which depict status or data relating to various physical devices/physical objects in the living room for a user to view or observe. Virtual object 232A can also include control features (e.g., dials, buttons or controls in any other shape or form) to enable a user to control or adjust or settings or configure/reconfigure associated physical devices/objects (e.g., devices in the living room). Similarly, virtual object 232B and/or virtual object 232C can also be used to access status or data relating to various physical devices/physical objects. Virtual object 232B and/or virtual object 232C can also be used to control or adjust or settings or configure/reconfigure associated physical devices/objects. For example, virtual object 232B can enable access to devices in the kitchen. Virtual object 232C can enable access to and adjust lighting in various locations (room 1, room 2, living room, kitchen) via different devices (e.g., lights and/or window shades).

Figure 4A:
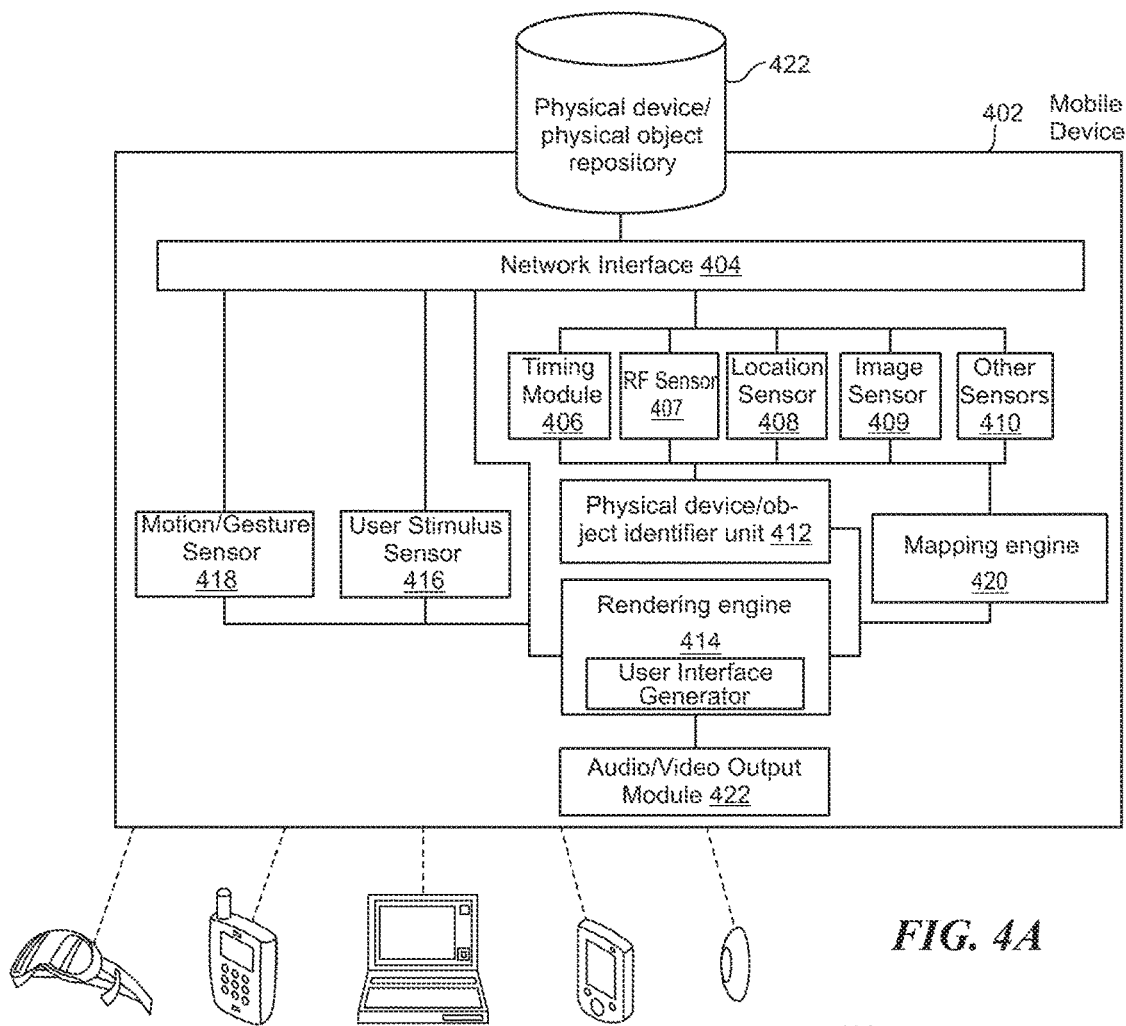
FIG. 4A depicts an example functional block diagram of a client device such as a mobile device having capabilities to facilitate virtual object control of a physical device and/or physical device control of a virtual object, in accordance with embodiments of the present disclosure.

The virtual objects 232A/B/C can be launched via a user device (e.g., a user device 102 as shown in the example of FIG. 1 or device as shown in the example of FIG. 4A). Virtual objects 232A/B/C can also be launched through detection by sensors installed elsewhere in the physical environment (e.g., physical infrastructure, furniture, fittings, devices, appliances, specialty instrumentation, electrical equipment, biological equipment, laboratory equipment, medical instrumentation, medical imaging units, manufacturing equipment, warehouse supplies or warehouse equipment, etc.). The virtual objects 232A/B/C can also be launched or instantiated through actuation or detection by, at or near the physical device(s) with which it they are associated. Detection can occur through gesture, voice, touch, motion, heat, speech, detected by the physical devices controlled the virtual objects or by other devices.

The controls or displays on the virtual objects 232a/b/c can be rearranged or reconfigured on a given virtual object or among the virtual objects 232a/b/c in any known or convenient manner without deviating from the novel art of the disclosure. Other forms of presenting or displaying information or data relating to physical devices via the virtual objects 232a/b/c may also be employed.

FIG. 2E depicts another room 240 in a real world environment showing examples of a virtual object 242 usable to control a physical device or physical devices, where the physical device is also usable to launch, access or control the virtual object 242 in accordance with embodiments of the present disclosure.

For example, the room 240 may be in a real world health care or patient care/treatment facility. The virtual object 242 may be launched in response to command from the user 246 (e.g. surgeon, doctor, nurse, etc.). The command can be initiated via any user device (e.g., user device 102 of FIG. 1 or device 402 of FIG. 4A). The virtual object 242 can be used to actuate, access or control the physical devices/objects (medical instrument 241 and/or surgical lights 243), for example, to adjust settings on the instrument 241, access different functionalities on instrument 241, adjust brightness, color of the light 243 or to turn the light 243 on/off. The virtual object 242 can also be used to monitor patient condition or access treatment/condition data/graphs/tables.

The physical devices/objects of room 240 can also be used to actuate or launch instances of virtual objects (e.g., virtual object 242). An instance of the virtual object can be launched in an augmented reality environment in response to action detected by, at or near the physical devices (241 and/or 243). Physical devices (241 and/or 243) may also be able to detect certain physical actions performed on them causing the virtual object 242 to appear, be rendered and/or change observable behavior.

FIG. 3A depicts an example functional block diagram of a host server 300 that facilitates virtual object control of a physical device and/or physical device control of a virtual object, in accordance with embodiments of the present disclosure.

The host server 300 includes a network interface 302, a physical device/object identifier unit 310, a mapping engine 340, a physical device controller 350 and/or a virtual object controller 360. The host server 300 is also coupled to a physical device controller repository 322, a virtual object controller repository 324 and/or a mapping repository 326. Each of the physical device/object identifier unit 310, the mapping engine 340, the physical device controller 350 and/or the virtual object controller 360. can be coupled to each other.

Additional or less modules can be included without deviating from the techniques discussed in this disclosure. In addition, each module in the example of FIG. 3A can include any number and combination of sub-modules, and systems, implemented with any combination of hardware and/or software modules.

The host server 300, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

The network interface 302 can be a networking module that enables the host server 300 to mediate data in a network with an entity that is external to the host server 300, through any known and/or convenient communications protocol supported by the host and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, 5G, etc.), Bluetooth, a router, an access point, a wireless router, a switch, a multilayer switch, a protocol converter, a gateway, a bridge, bridge router, a hub, a digital media receiver, and/or a repeater.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or have its functionality distributed in part or in full. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, flash, optical storage, to name a few), but may or may not be limited to hardware.

One embodiment of the host server 300 includes the physical device/object identifier unit 310. The physical device/object identifier unit 310 can be any combination of software agents and/or hardware modules (e.g., including processors and/or memory units) able to detect, identify, inventory, update, physical objects or physical devices in any physical environment.

The physical devices/objects that are identified or detected can be associated with virtual objects. The virtual object associated with the physical device(s) can be used to control, access, configure, view, adjust the physical device (s). The physical device(s) can vice versa, also be used to control, access, configure, view, adjust the virtual object(s).

Note that for any pair of associated physical object and virtual object, the physical object may be used to access or control the virtual object (e.g., physical object A and virtual object M). For the given pair of association, the virtual object M may or may not be usable to control or access physical object A. However the mapping may change with hardware and/or software configuration or adjustment (e.g., by the mapping engine 340). The unit 310 can update, aggregate the list of physical devices associated with virtual object(s) continuously or regularly or on user request/command or system request/command.

One embodiment of the host server 300 further includes the mapping engine 340. The mapping engine 340 can be any combination of software agents and/or hardware modules (e.g., including processors and/or memory units) able to track, manage, update associations between physical devices/objects and virtual objects that are able to access or control one another. The mapping engine 340 can also determine, ascertain, control and/or administer the features/functions and/or attributes of the physical device(s) that can be controlled by the virtual object(s).

Similarly, the mapping engine 340 can also determine, ascertain, control and/or administer the features/functions of the virtual objects that can be access, controlled or configured by the physical objects/devices. Specific features/functions of the virtual object(s) can also be mapped to specific features/functions and/or attributes of the physical device(s). Therefore, when a function/feature of a physical device is actuated or accessed, the corresponding feature/function of a virtual object mapped to it can be depicted or presented in the augmented reality environment. Similarly (e.g., by the virtual object controller 360), when a given function/feature of a virtual object is adjusted, accessed, or actuated, the corresponding feature/function or attribute of a mapped physical device/object is changed or updated (e.g., by the physical device controller 350).

The physical device controller 350 can be any combination of software agents and/or hardware modules (e.g., including processors and/or memory units) able to modify, update, change, configure, physical device functionality or setting in response to control by corresponding virtual object(s). The virtual object controller 360 can be any combination of software agents and/or hardware modules (e.g., including processors and/or memory units) able to modify, update, change, configure, virtual object behavior, rendering, functionality and/or setting in response to control by corresponding physical device(s).

FIG. 3B depicts an example block diagram illustrating the components of the host server 300 that facilitates virtual object control of a physical device and/or physical device control of a virtual object, in accordance with embodiments of the present disclosure.

In one embodiment, host server 300 includes a network interface 302, a processing unit 334, a memory unit 336, a storage unit 338, a location sensor 340, and/or a timing module 342. Additional or less units or modules may be included. The host server 300 can be any combination of hardware components and/or software agents to facilitate virtual object control of a physical device and/or physical device control of a virtual object. The network interface 302 has been described in the example of FIG. 3A.

One embodiment of the host server 300 includes a processing unit 334. The data received from the network interface 302, location sensor 340, and/or the timing module 342 can be input to a processing unit 334. The location sensor 340 can include GPS receivers, RF transceiver, an optical rangefinder, etc. The timing module 342 can include an internal clock, a connection to a time server (via NTP), an atomic clock, a GPS master clock, etc.

The processing unit 334 can include one or more processors, CPUs, microcontrollers, FPGAs, ASICs, DSPs, or any combination of the above. Data that is input to the host server 300 can be processed by the processing unit 334 and output to a display and/or output via a wired or wireless connection to an external device, such as a mobile phone, a portable device, a host or server computer by way of a communications component.

One embodiment of the host server 300 includes a memory unit 336 and a storage unit 338. The memory unit 335 and a storage unit 338 are, in some embodiments, coupled to the processing unit 334. The memory unit can include volatile and/or non-volatile memory. In virtual object deployment, the processing unit 334 may perform one or more processes related to facilitating virtual object control of a physical device and/or physical device control of a virtual object.

In some embodiments, any portion of or all of the functions described of the various example modules in the host server 300 of the example of FIG. 3A can be performed by the processing unit 334.

FIG. 4A depicts an example functional block diagram of a client device such as a mobile device 402 having capabilities to facilitate virtual object control of a physical device and/or physical device control of a virtual object, in accordance with embodiments of the present disclosure.

The client device 402 includes a network interface 404, a timing module 406, an RF sensor 407, a location sensor 408, an image sensor 409, a physical device/object identifier unit 412, a rendering engine 414, a user stimulus sensor 416, a motion/gesture sensor 418, and mapping engine 420, an audio/video output module 422, and/or other sensors 410. The client device 402 may be any electronic device such as the devices described in conjunction with the client devices 102A-N in the example of FIG. 1 including but not limited to portable devices, a computer, a server, location-aware devices, mobile phones, PDAs, laptops, palmtops, iPhones, cover headsets, heads-up displays, helmet mounted display, head-mounted display, scanned-beam display, smart lens, monocles, smart glasses/goggles, wearable computer such as mobile enabled watches or eyewear, and/or any other mobile interfaces and viewing devices, etc.

In one embodiment, the client device 402 is coupled to a physical device/physical object repository 422. The physical device/physical object repository 422 may be internal to or coupled to the mobile device 402 but the contents stored therein can be further described with reference to the example of the physical device/physical object repository 422 described in the example of FIG. 1.

Additional or less modules can be included without deviating from the novel art of this disclosure. In addition, each module in the example of FIG. 4A can include any number and combination of sub-modules, and systems, implemented with any combination of hardware and/or software modules.

The client device 402, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 4A, the network interface 404 can be a networking device that enables the client device 402 to mediate data in a network with an entity that is external to the host server, through any known and/or convenient communications protocol supported by the host and the external entity. The network interface 404 can include one or more of a network adapter card, a wireless network interface card, a router, an access point, a wireless router, a switch, a multi-layer switch, a protocol converter, a gateway, a bridge, bridge router, a hub, a digital media receiver, and/or a repeater.

The client device 402 can provide functionalities described herein via a consumer client application (app) (e.g., consumer app, client app. Etc.). The consumer application includes a user interface that enables virtual object control of a physical device and/or physical device control of a virtual object.

Figure 4B:
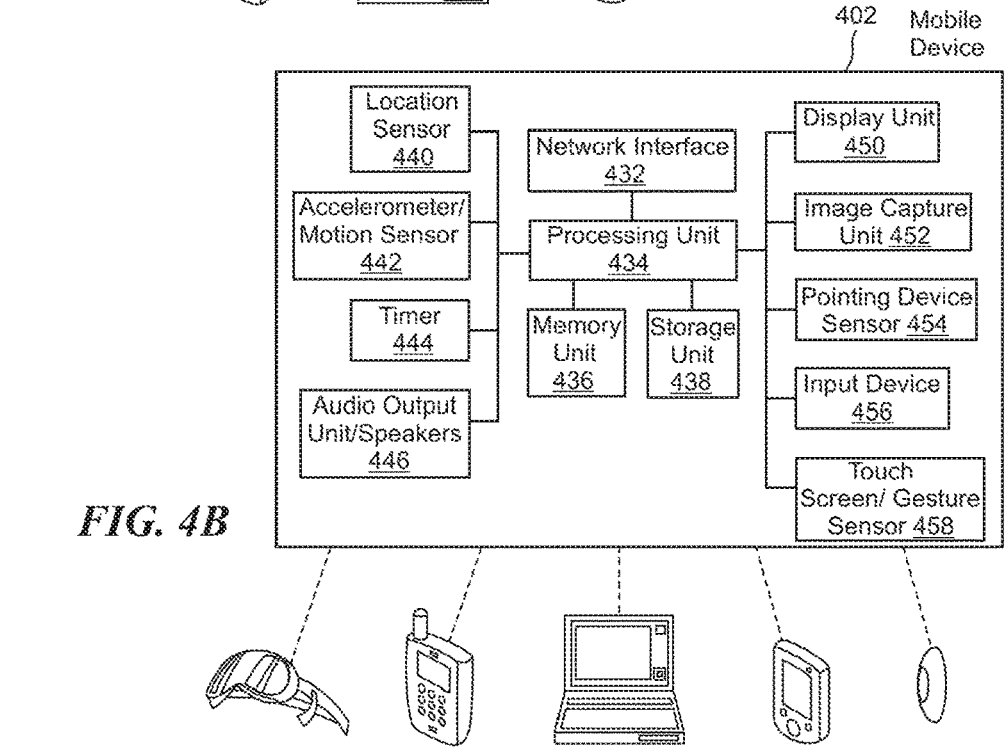
FIG. 4B depicts an example block diagram of the client device, which can be a mobile device having capabilities to facilitate virtual object control of a physical device and/or physical device control of a virtual object, in accordance with embodiments of the present disclosure.

One embodiment of the mobile device includes a processor (processing unit as shown in the example of FIG. 4B) coupled to the imaging sensor and memory coupled to the processor. The memory can have stored thereon instructions, which when executed by the processor, cause the processor to present a depiction of a virtual object in the augmented reality environment, the depiction of the virtual object being observable in the augmented reality environment, identify the physical object in a physical location that is controlled by the virtual object and/or determine functions of the physical object.

The memory can have further stored thereon instructions, which when executed by the processor, cause the processor to: render the one or more functions of the virtual object accessible for use in control of the physical object, based on the functions of the physical object.

In a further embodiment, the physical object is also used to access the one or more functions of the virtual object, For example, the processor may further operable to, detect a gesture performed in relation to the physical object, identify a function of the one or more functions of the virtual object corresponding to the gesture performed and/or update the depiction of the virtual object in the augmented reality environment, based on the function of the one or more functions of the virtual object that has been identified.

One embodiment further includes a sensor coupled to the processor. The sensor can detect actuation of the physical device to access the one or more functions of the virtual object. The sensor can include, one or more of, a heat sensor, a proximity sensor, a motion sensor, a pressure sensor, a light sensor, a temperature, and/or an acoustic sensor.

FIG. 4B depicts an example block diagram of the client device, which can be a mobile device having capabilities to facilitate virtual object control of a physical device and/or physical device control of a virtual object, in accordance with embodiments of the present disclosure.

In one embodiment, client device 402 (e.g., a user device) includes a network interface 432, a processing unit 434, a memory unit 436, a storage unit 438, a location sensor 440, an accelerometer/motion sensor 442, an audio output unit/speakers 446, a display unit 450, an image capture unit 452, a pointing device/sensor 454, an input device 456, and/or a touch screen sensor 458. Additional or less units or modules may be included. The client device 402 can be any combination of hardware components and/or software agents for facilitating virtual object control of a physical device and/or physical device control of a virtual object. The network interface 432 has been described in the example of FIG. 4A.

One embodiment of the client device 402 further includes a processing unit 434. The location sensor 440, accelerometer/motion sensor 442, and timer 444 have been described with reference to the example of FIG. 4A.

The processing unit 434 can include one or more processors, CPUs, microcontrollers, FPGAs, ASICs, DSPs, or any combination of the above. Data that is input to the client device 402 for example, via the image capture unit 452, pointing device/sensor 454, input device 456 (e.g., keyboard), and/or the touch screen sensor 458 can be processed by the processing unit 434 and output to the display unit 450, audio output unit/speakers 446 and/or output via a wired or wireless connection to an external device, such as a host or server computer that generates and controls access to simulated objects by way of a communications component.

One embodiment of the client device 402 further includes a memory unit 436 and a storage unit 438. The memory unit 436 and a storage unit 438 are, in some embodiments, coupled to the processing unit 434. The memory unit can include volatile and/or non-volatile memory. In rendering or presenting an augmented reality environment, the processing unit 434 can perform one or more processes related to facilitating virtual object control of a physical device and/or physical device control of a virtual object.

In some embodiments, any portion of or all of the functions described of the various example modules in the client device 402 of the example of FIG. 4A can be performed by the processing unit 434. In particular, with reference to the mobile device illustrated in FIG. 4A, various sensors and/or modules can be performed via any of the combinations of modules in the control subsystem that are not illustrated, including, but not limited to, the processing unit 434 and/or the memory unit 436.

Figure 5A:
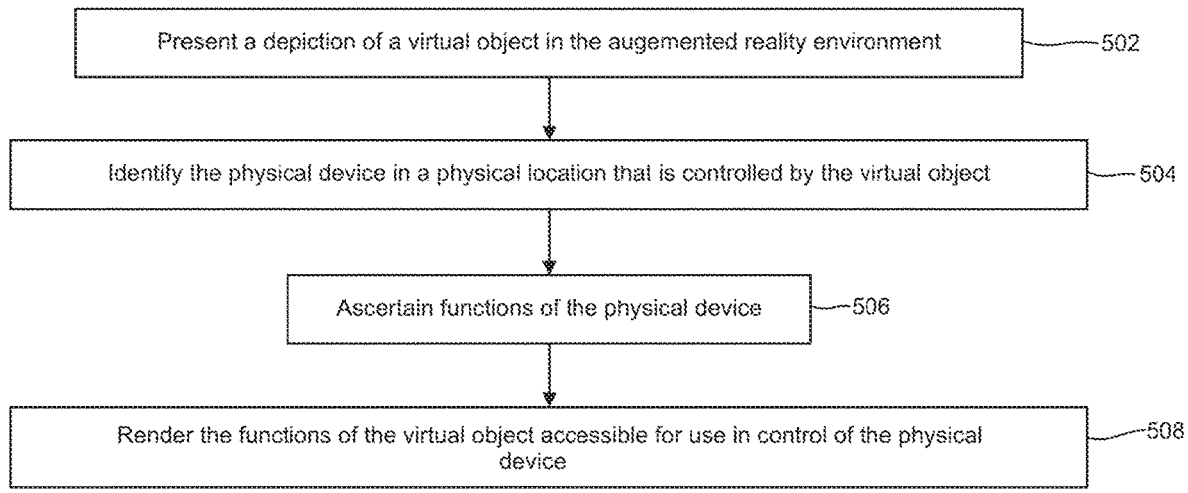
FIG. 5A depicts a flow chart illustrating an example process to use a virtual object to control a physical device, in accordance with embodiments of the present disclosure.

FIG. 5A depicts a flow chart illustrating an example process to use a virtual object to control a physical device, in accordance with embodiments of the present disclosure.

In process 502, a depiction of a virtual object in an augmented reality environment is presented. The virtual object can be presented such that it is observable or perceptible in the augmented reality environment, for example, to a human user. In addition, the one or more functions of the virtual object accessible in the augmented reality environment are used for control of a physical device In process 504, the physical device in a physical location that is controlled by the virtual object is identified. In process 506, functions of the physical device are ascertained. In process 508, the functions of the virtual object accessible for use in control of the physical device are rendered, for example, based on the functions of the physical device. In one embodiment, the virtual object is used to adjust a setting of the physical device to a value amongst a set of values.

In general, the virtual object can actuate the physical device through any known or convenient manner. The signal for an actuation can be sent via any mechanism for energy transfer. For example, the virtual object is accessed to control the physical device through one or more of, mechanical actuation and electrical actuation.

Figure 5B:
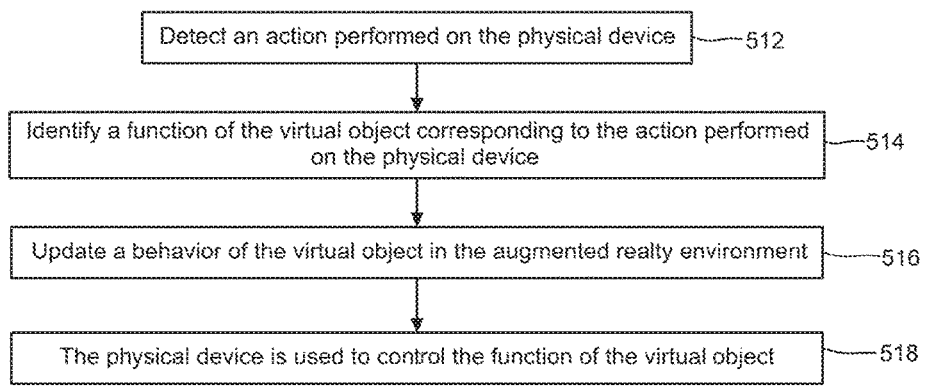
FIG. 5B depicts a flow chart illustrating an example process to use a physical device to control a virtual object, in accordance with embodiments of the present disclosure.

The virtual object is accessed to control the physical device through magnetic actuation. The virtual object is accessed to control the physical device through acoustic actuation. The virtual object is accessed to control the physical device through biometric or biochemical actuation FIG. 5B depicts a flow chart illustrating an example process to use a physical device to control a virtual object, in accordance with embodiments of the present disclosure.

In process 512, an action performed on the physical device is detected, and the virtual object can be depicted in the augmented reality environment in response to action performed on the physical device. In process 514, a function of the virtual object corresponding to the action performed on the physical device is identified.

In process 516, a behavior of the virtual object is updated in the augmented reality environment. The behavior of the virtual object can be updated, for example, based on the function of the one or more functions of the virtual object that has been identified. The function of the one or more functions can be accessible by a human user via the depiction of the virtual object, for the human user to interact with the physical device. In process 518, the physical device is used to control the function of the virtual object.

Figure 5C:
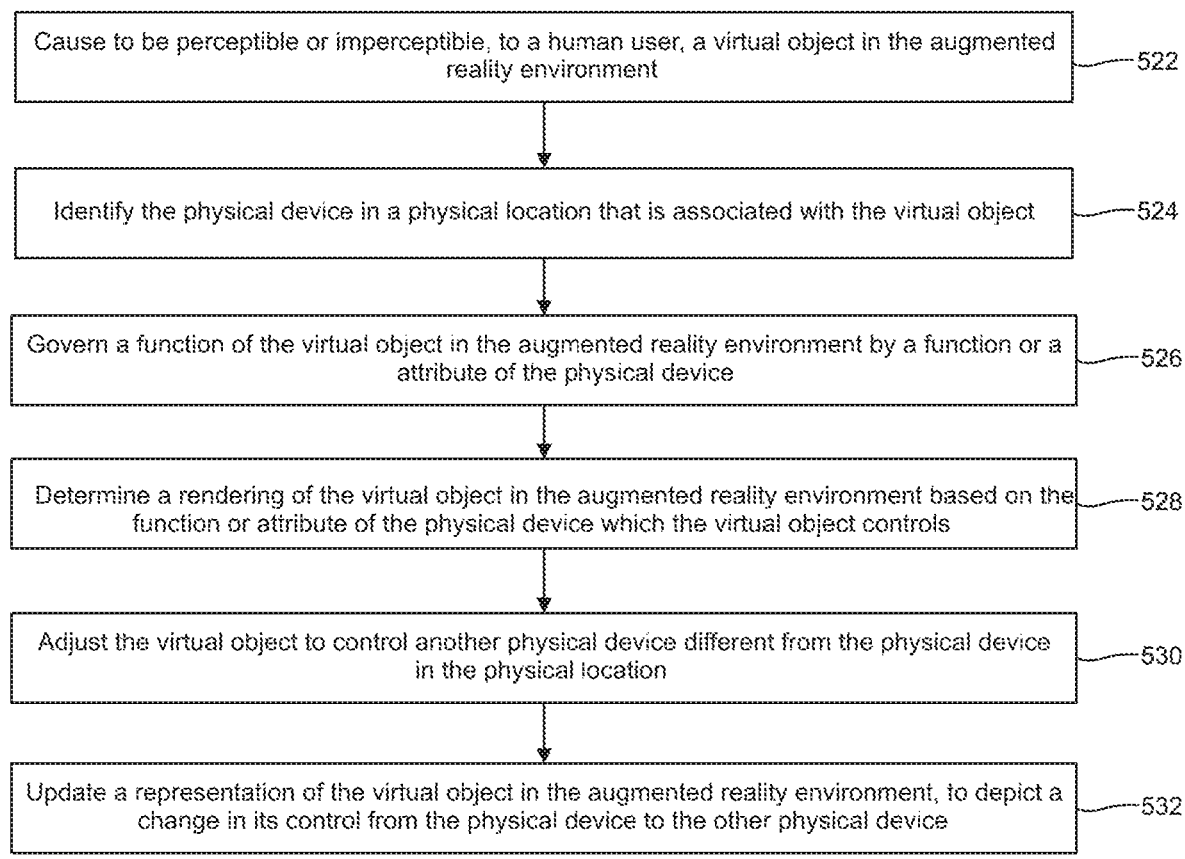
FIG. 5C depicts a flow chart illustrating an example process to use a virtual object to control multiple physical devices, in accordance with embodiments of the present disclosure.

FIG. 5C depicts a flow chart illustrating an example process to use a virtual object to control multiple physical devices, in accordance with embodiments of the present disclosure.

In process 522, a virtual object in the augmented reality environment is caused to be perceptible or imperceptible, to a human user. The virtual object can be associated with a physical device in a physical location. In addition, the augmented reality environment can include, for example, the real world environment or a representation of the real world environment associated with the physical location in which the physical device is physically located. The augmented reality environment can also include a depiction of the virtual object. The virtual object can be made perceptible or imperceptible to the human user in the augmented reality environment depending on a rule set. In one embodiment, the rule set can include a proximity parameter which can include an indication of a physical distance between the human user and the physical device.

In process 524, the physical device in a physical location that is associated with the virtual object is identified. In process 526, a function of the virtual object in the augmented reality environment is governed by a function or an attribute of the physical device. In process 528, a rendering of the virtual object in the augmented reality environment based on the function or the attribute of the physical device which the virtual object controls. In process 530, the virtual object is adjusted to control another physical device different from the physical device in the physical location.

In process 532, a representation of the virtual object in the augmented reality environment is updated to depict a change in its control from the physical device to the other physical device. In addition, the virtual object can be usable to control multiple functions or attributes of the physical device. The virtual object is, in one embodiment, depicted as an instrument panel having multiple virtual control objects in the augmented reality environment where the multiple virtual control objects are operable to access or control the multiple functions or attributes of the physical device.

Moreover, the virtual object can be used to control multiple physical devices in the physical location. In one embodiment, the virtual object is depicted as an instrument panel having multiple virtual control objects in the augmented reality environment where the multiple virtual control objects are operable to access or control the multiple physical devices.

The augmented reality environment can be rendered at least in part in a hologram, where the hologram can be accessible in 3D and in 360 degrees. In general, perceptibility of the virtual object and perceptibility of the representation of the real environment is configurable or adjustable by the human user FIG. 6 is a block diagram illustrating an example of a software architecture 600 that may be installed on a machine, in accordance with embodiments of the present disclosure.

Figure 6:
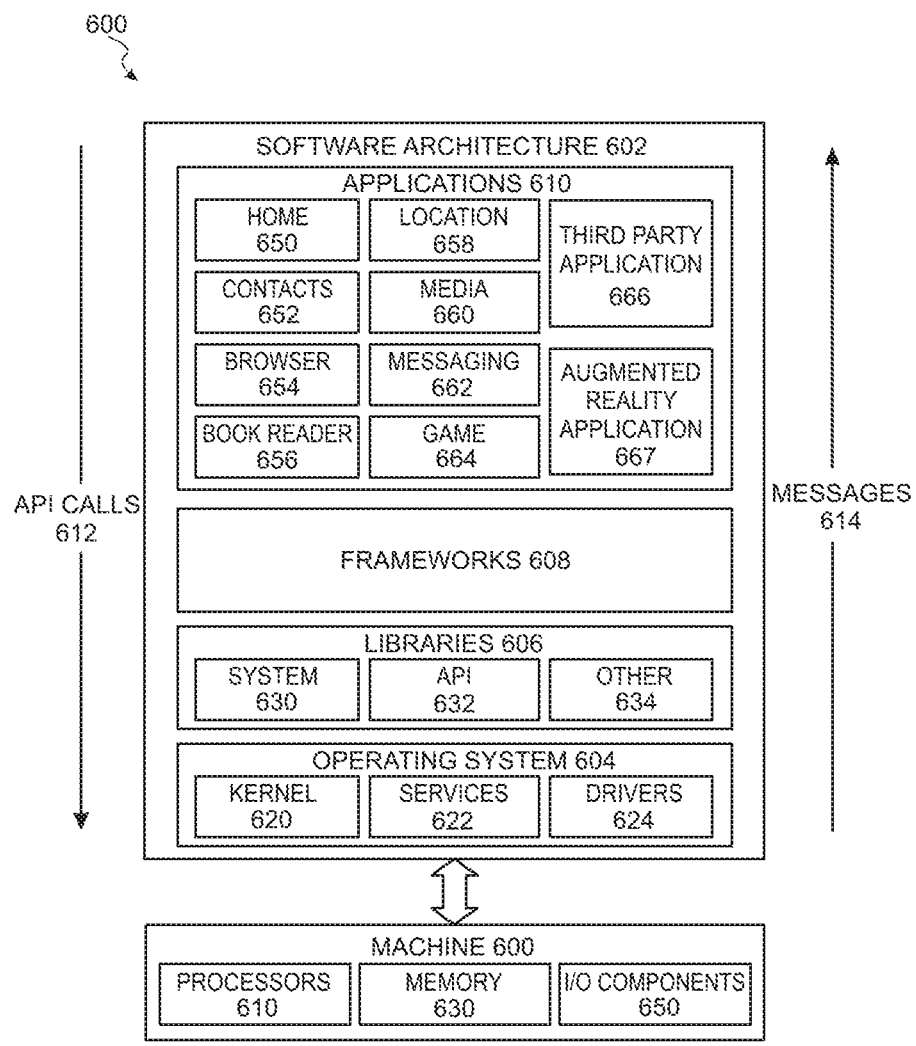
FIG. 6 is a block diagram illustrating an example of a software architecture that may be installed on a machine, in accordance with embodiments of the present disclosure.

FIG. 6 is a block diagram 600 illustrating an architecture of software 602, which can be installed on any one or more of the devices described above. FIG. 6 is a non-limiting example of a software architecture, and it will be appreciated that many other architectures can be implemented to facilitate the functionality described herein. In various embodiments, the software 602 is implemented by hardware such as machine 700 of FIG. 7 that includes processors 710, memory 730, and input/output (I/O) components 750. In this example architecture, the software 602 can be conceptualized as a stack of layers where each layer may provide a particular functionality. For example, the software 602 includes layers such as an operating system 604, libraries 606, frameworks 608, and applications 610. Operationally, the applications 610 invoke API calls 612 through the software stack and receive messages 614 in response to the API calls 612, in accordance with some embodiments.

In some embodiments, the operating system 604 manages hardware resources and provides common services. The operating system 604 includes, for example, a kernel 620, services 622, and drivers 624. The kernel 620 acts as an abstraction layer between the hardware and the other software layers consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH drivers, flash memory drivers, serial communication drivers (e.g., Universal Serial Bus (USB) drivers), Wi-Fi drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematics functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a search/discovery application 656, a location application 658, a media application 660, a messaging application 662, a game application 664, and other applications such as a third party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third party application 666 (e.g., an application developed using the Android, Windows or iOS. software development kit (SDK) by an entity other than the vendor of the particular platform) may be mobile software running on a mobile operating system such as Android, Windows or iOS, or another mobile operating systems. In this example, the third party application 666 can invoke the API calls 612 provided by the operating system 604 to facilitate functionality described herein.

An augmented reality application 667 may implement any system or method described herein, including integration of augmented, alternate, virtual and/or mixed realities for digital experience enhancement, or any other operation described herein.

Figure 7:
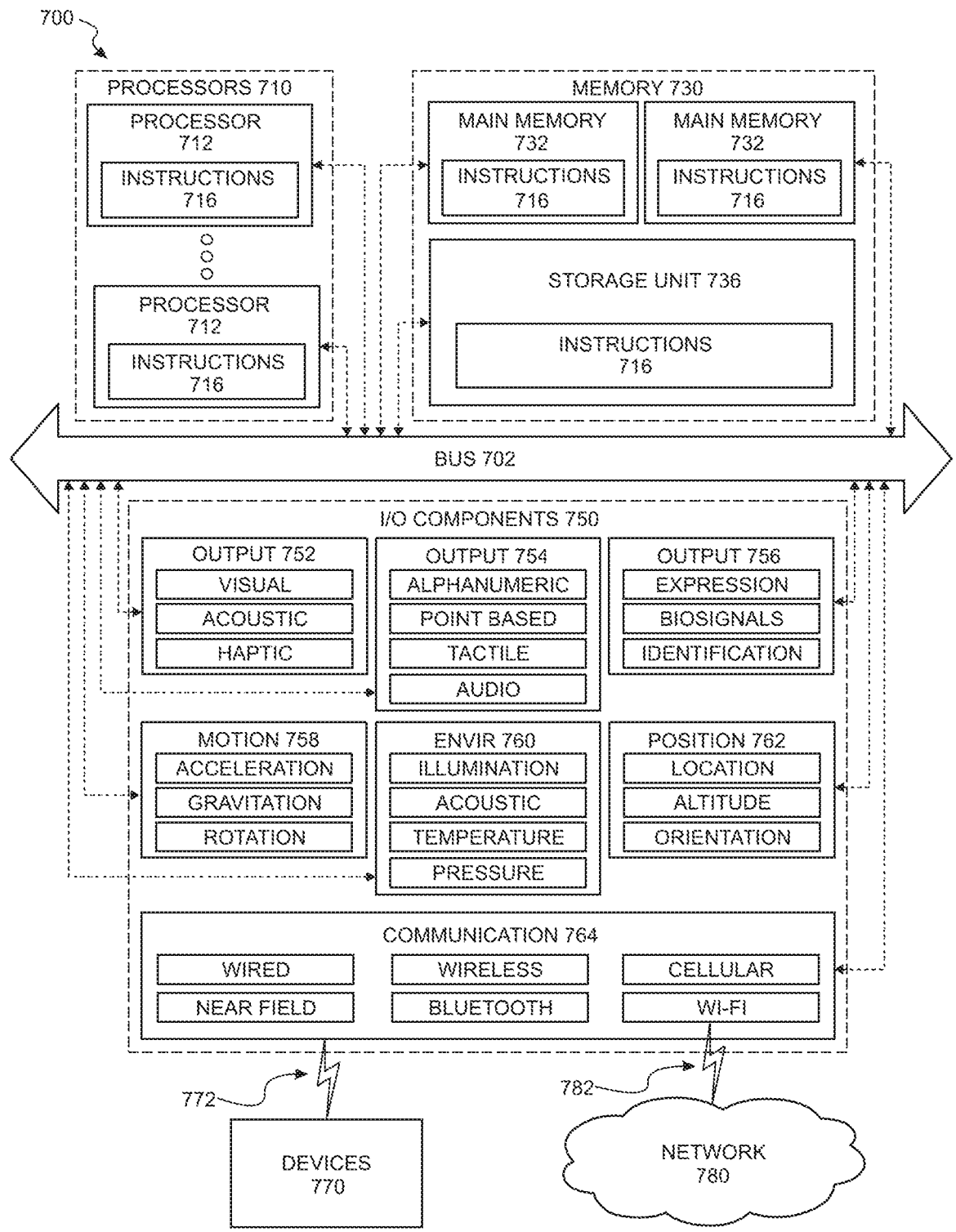
FIG. 7 is a block diagram illustrating components of a machine, according to some example embodiments, able to read a set of instructions from a machine-readable medium (e.g., a machine-readable storage medium) and perform any one or more of the methodologies discussed herein.

FIG. 7 is a block diagram illustrating components of a machine 700, according to some example embodiments, able to read a set of instructions from a machine-readable medium (e.g., a machine-readable storage medium) and perform any one or more of the methodologies discussed herein.

Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein can be executed. Additionally, or alternatively, the instruction can implement any module of FIG. 3A and any module of FIG. 4A, and so forth. The instructions transform the general, non-programmed machine into a particular machine programmed to carry out the described and illustrated functions in the manner described.

In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a head mounted device, a smart lens, goggles, smart glasses, a smart home device (e.g., a smart appliance), other smart devices, a web appliance, a network router, a network switch, a network bridge, a Blackberry, a processor, a telephone, a web appliance, a console, a hand-held console, a (hand-held) gaming device, a music player, any portable, mobile, hand-held device or any device or machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 can include processors 710, memory/storage 730, and I/O components 750, which can be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 712 and processor 714 that may execute instructions 716. The term "processor" is intended to include multi-core processor that may comprise two or more independent processors (sometimes referred to as "cores") that can execute instructions contemporaneously. Although FIG. 7 shows multiple processors, the machine 700 may include a single processor with a single core, a single processor with multiple cores (e.g., a multi-core processor), multiple processors with a single core, multiple processors with multiples cores, or any combination thereof.

The memory/storage 730 can include a main memory 732, a static memory 734, or other memory storage, and a storage unit 736, both accessible to the processors 710 such as via the bus 702. The storage unit 736 and memory 732 store the instructions 716 embodying any one or more of the methodologies or functions described herein. The instructions 716 can also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, the term "machine-readable medium" or "machine-readable storage medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" or "machine-readable storage medium" should be taken to include a single medium or multiple media (e.g., a centralized or distributed database, or associated caches and servers) able to store instructions 716. The term "machine-readable medium" or "machine-readable storage medium" shall also be taken to include any medium, or combination of multiple media, that is capable of storing, encoding or carrying a set of instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" or "machine-readable storage medium" refers to a single storage apparatus or device, as well as "cloud-based" storage systems or storage networks that include multiple storage apparatus or devices. The term "machine-readable medium" or "machine-readable storage medium" excludes signals per se.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The I/O components 750 can include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 can include many other components that are not shown in FIG. 7. The I/O components 750 are grouped according to functionality merely for simplifying the following discussion and the grouping is in no way limiting. In example embodiments, the I/O components 750 can include output components 752 and input components 754. The output components 752 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), eye trackers, and the like.

In further example embodiments, the I/O components 752 can include biometric components 756, motion components 758, environmental components 760, or position components 762 among a wide array of other components. For example, the biometric components 756 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 can include acceleration sensor components (e.g., an accelerometer), gravitation sensor components, rotation sensor components (e.g., a gyroscope), and so forth. The environmental components 760 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or other suitable device to interface with the network 780. In further examples, communication components 764 include wired communication components, wireless communication components, cellular communication components, Near Field Communication (NFC) components, Bluetooth. components (e.g., Bluetooth. Low Energy), WIFI components, and other communication components to provide communication via other modalities. The devices 770 may be another machine or any of a wide variety of peripheral devices (e.g., a peripheral device coupled via a USB).

The network interface component can include one or more of a network adapter card, a wireless network interface card, a router, an access point, a wireless router, a switch, a multilayer switch, a protocol converter, a gateway, a bridge, bridge router, a hub, a digital media receiver, and/or a repeater.

The network interface component can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Moreover, the communication components 764 can detect identifiers or include components operable to detect identifiers. For example, the communication components 764 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI signal triangulation, location via detecting a BLUETOOTH or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI.®. network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or other type of cellular or wireless coupling. In this example, the coupling 782 can implement any of a variety of types of data transfer technology, such as Single Carrier Radio Transmission Technology, Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, 5G, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 can be transmitted or received over the network 780 using a transmission medium via a network interface device (e.g., a network interface component included in the communication components 764) and utilizing any one of a number of transfer protocols (e.g., HTTP). Similarly, the instructions 716 can be transmitted or received using a transmission medium via the coupling 772 (e.g., a peer-to-peer coupling) to devices 770. The term "transmission medium" shall be taken to include any intangible medium that is capable of storing, encoding, or carrying the instructions 716 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the innovative subject matter has been described with reference to specific example embodiments, various modifications and changes may be made to these embodiments without departing from the broader scope of embodiments of the present disclosure. Such embodiments of the novel subject matter may be referred to herein, individually or collectively, by the term "innovation" merely for convenience and without intending to voluntarily limit the scope of this application to any single disclosure or novel or innovative concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method of an augmented reality environment, the method, comprising:
   presenting a depiction of a virtual object in the augmented reality environment, the depiction of the virtual object being observable in the augmented reality environment;
   wherein, one or more functions of the virtual object accessible in the augmented reality environment are used for control of a physical device;
   responsive to detecting action performed on the physical device, identifying a function of the one or more functions of the virtual object corresponding to the action performed on the physical device;
   updating the depiction of the virtual object in the augmented reality environment based on the function of the one or more functions of the virtual object that has been identified;
   wherein,
   the function of the one or more functions is accessible by a human user via the depiction of the virtual object, for the human user to interact with the physical device.

2. The method of claim 1, further comprising:
   identifying the physical device in a physical location that is controlled by the virtual object;
   ascertaining functions of the physical device;
   rendering the one or more functions of the virtual object accessible for use in control of the physical device, based on the functions of the physical device.

3. The method of claim 1, wherein:
   the virtual object is used to adjust a setting of the physical device to a value amongst a set of values.

4. The method of claim 1, wherein:
   the virtual object is depicted in the augmented reality environment in response to the action performed on the physical device.

5. The method of claim 1, wherein:
   an instance of the virtual object is launched in the augmented reality environment in response to the action detected by the physical device;
   further wherein, the physical device is also used to access the one or more functions of the virtual object.

6. The method of claim 1, wherein
   the virtual object is accessed to control the physical device through one or more of, mechanical actuation, electrical actuation, magnetic actuation, acoustic actuation, biometric and biochemical actuation.

7. A method of an augmented reality environment in a real world environment, the method, comprising:
   causing to be perceptible or imperceptible, to a human user, a virtual object in the augmented reality environment;
   wherein, the virtual object is associated with a physical device in a physical location;
   wherein, the augmented reality environment includes:
      the real world environment or a representation of the real world environment associated with the physical location in which the physical device is physically located;
      the virtual object;
   wherein, the virtual object is usable to control the physical device;
   further wherein, the virtual object is able to control multiple physical devices in the physical location;
   further wherein, a function of the virtual object in the augmented reality environment is governed by a function or an attribute of the physical device;
   further wherein, a rendering of the virtual object in the augmented reality environment is determined based on the function or the attribute of the physical device which the virtual object controls.

8. The method of claim 7, wherein:
   the physical device associated with the virtual object, is used to control the virtual object.

9. The method of claim 7, wherein:
the virtual object includes a biometric sensor to authenticate the human user to access the physical device.

10. The method of claim 7, wherein:
the virtual object is usable to control multiple functions or attributes of the physical device;
the virtual object is depicted as an instrument panel having multiple virtual control objects in the augmented reality environment;
wherein, the multiple virtual control objects are operable to access or control the multiple functions or attributes of the physical device.

11. The method of claim 7, wherein:
the virtual object is adjustable to control another physical device different from the physical device in the physical location;
further wherein, a representation of the virtual object is updated in the augmented reality environment, to depict a change in its control from the physical device to the other physical device.

12. The method of claim 7, wherein:
the virtual object is depicted as an instrument panel having multiple virtual control objects in the augmented reality environment;
wherein, the multiple virtual control objects are operable to access or control the multiple physical devices in the physical location.

13. A system to facilitate control of a physical object of a real world environment by a virtual object in an augmented reality environment, the system, comprising:
a processor;
memory having stored thereon instructions, which when executed by a processor, cause the processor to;
render perceptible or imperceptible, to a human user, a virtual object in the augmented reality environment,
wherein, the virtual object is associated with a physical device in a physical location;
wherein, the augmented reality environment includes:
the real world environment or a representation of the real world environment associated with the physical location in which the physical device is physically located;
the virtual object;
wherein, the virtual object is made perceptible or imperceptible to the human user in the augmented reality environment depending on a rule set;
wherein, the rule set includes a proximity parameter;
wherein, the proximity parameter includes an indication of a physical distance between the human user and the physical device;
wherein, the augmented reality environment is rendered at least in part in a hologram, wherein the hologram is accessible in 3D and in 360 degrees;
wherein, perceptibility of the virtual object and perceptibility of the representation of the real environment is configurable or adjustable by the human user.

14. A system to facilitate control of a physical object by a virtual object in an augmented reality environment, the system, comprising:
a processor;
memory having stored thereon instructions, which when executed by a processor, cause the processor to:
present a depiction of a virtual object in the augmented reality environment, the depiction of the virtual object being observable in the augmented reality environment;
wherein, one or more functions of the virtual object accessible in the augmented reality environment are used for control of the physical object;
identify the physical object in a physical location that is controlled by the virtual object;
wherein, perceptibility of the virtual object and perceptibility of a representation of the physical location in the augmented reality environment is configurable or adjustable.

15. The system of claim 14, wherein, the processor is further operable to:
determine functions of the physical object;
render the one or more functions of the virtual object accessible for use in control of the physical object, based on the functions of the physical object.

16. The system of claim 14,
wherein, the physical object is also used to access the one or more functions of the virtual object;
wherein, the processor is further operable to:
detect a gesture performed in relation to the physical object;
identify a function of the one or more functions of the virtual object corresponding to the gesture performed;
update the depiction of the virtual object in the augmented reality environment, based on the function of the one or more functions of the virtual object that has been identified.

17. The system of claim 14, further comprising,
a sensor coupled to the processor;
wherein, the sensor detects actuation of the physical device to access the one or more functions of the virtual object.

18. The system of claim 14, wherein, the sensor includes one or more of, a heat sensor, a proximity sensor, a motion sensor, a pressure sensor, a light sensor, a temperature, and an acoustic sensor.

* * * * *